(12) United States Patent
Aoki

(10) Patent No.: US 9,154,688 B2
(45) Date of Patent: Oct. 6, 2015

(54) SOLID-STATE IMAGE CAPTURE ELEMENT, IMAGE CAPTURE DEVICE, AND FOCUS CONTROL METHOD

(71) Applicant: FUJIFILM Corporation, Tokyo (JP)

(72) Inventor: Takashi Aoki, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/227,622

(22) Filed: Mar. 27, 2014

(65) Prior Publication Data
US 2014/0211059 A1    Jul. 31, 2014

Related U.S. Application Data

(63) Continuation of application No. PCT/JP2012/072944, filed on Sep. 7, 2012.

(30) Foreign Application Priority Data

Sep. 28, 2011 (JP) ................. 2011-213128

(51) Int. Cl.
G02B 7/34 (2006.01)
H04N 5/369 (2011.01)
H04N 5/372 (2011.01)
H04N 5/232 (2006.01)

(52) U.S. Cl.
CPC .............. *H04N 5/23212* (2013.01); *G02B 7/34* (2013.01); *H04N 5/3696* (2013.01); *H04N 5/372* (2013.01)

(58) Field of Classification Search
CPC ........................................................ G02B 7/34
USPC .................................................. 348/349, 350
See application file for complete search history.

(56) References Cited

U.S. PATENT DOCUMENTS 8,319,882 B2    11/2012 Fujii et al.
8,804,027 B2*   8/2014 Ichimiya ....................... 348/349
2011/0058070 A1 3/2011 Awazu
(Continued)

FOREIGN PATENT DOCUMENTS

CN    101952758 A     1/2011
JP    2008-299184 A   12/2008
(Continued)

OTHER PUBLICATIONS

Japanese Office Action issued in Japanese Application No. 2013-536133, dated May 20, 2014, with partial English translation thereof.
(Continued)

Primary Examiner — Albert Cutler
(74) Attorney, Agent, or Firm — Birch, Stewart, Kolasch & Birch, LLP

(57) ABSTRACT

A solid-state image capture element includes a pixel, which receives light of one of a pair of light beams which pass through iris regions of different locations on a photographic lens, and a pixel which receives light of the other, in a pair of said pixels. The pair of pixels are positioned shifted from one another in a direction which intersects the x-axis which is the phase difference direction. The pair includes a plurality of first pairs and second pairs which respectively have mutually inverse location relations with respect to the pixels and the pixels therein. The first pair and the second pair are alternately positioned in either the phase difference detection direction or the direction which is orthogonal thereto.

10 Claims, 16 Drawing Sheets

(56) References Cited

U.S. PATENT DOCUMENTS

| | | | |
|---|---|---|---|
| 2011/0063484 A1 | 3/2011 | Fujii et al. | |
| 2011/0134310 A1* | 6/2011 | Kimura | 348/345 |
| 2011/0228127 A1* | 9/2011 | Nakagawa | 348/222.1 |
| 2011/0310280 A1* | 12/2011 | Goto | 348/302 |
| 2012/0044406 A1* | 2/2012 | Shimoda et al. | 348/345 |

FOREIGN PATENT DOCUMENTS

| | | |
|---|---|---|
| JP | 2009-89132 A | 4/2009 |
| JP | 2009-122524 A | 6/2009 |
| JP | 2010-152161 A | 7/2010 |
| JP | 2011-128302 A | 6/2011 |
| WO | WO 2010/005105 A1 | 1/2010 |
| WO | WO 2010/007772 A1 | 1/2010 |
| WO | WO 2010/041721 A1 | 4/2010 |
| WO | WO2010131444 * | 11/2010 |

OTHER PUBLICATIONS

Chinese Office Action in the corresponding Chinese Patent Application No. 201280047764.5 dated Nov. 4, 2014, with English translation.

PCT/ISA/210—mailed on Nov. 6, 2012, issued in PCT/JP2012/072944, with English translation.

European Search Report dated Jul. 7, 2015 in corresponding European patent application No. 12835565.8.

* cited by examiner

PRIOR ART

DUE TO THE INCLINED PATTERN, THE PHASE IS DEVIATED
BY AN AMOUNT CORRESPONDING TO THE INCLINATION,
SO THAT A FALSE DETECTION IS MADE
IN THE PHASE DIFFERENCE DETECTION

PRIOR ART

SOLID-STATE IMAGE CAPTURE ELEMENT, IMAGE CAPTURE DEVICE, AND FOCUS CONTROL METHOD

CROSS-REFERENCE TO RELATED APPLICATIONS

This is a continuation of International Application No. PCT/JP2012/072944 filed on Sep. 7, 2012, and claims priority from Japanese Patent Application No. 2011-213128 filed on Sep. 28, 2011, the entire disclosures of which are incorporated herein by reference.

TECHNICAL FIELD

The invention relates to a solid-state image-capture element, an imaging device and a focus control method.

BACKGROUND ART

In recent years, as a solid-state image-capture element such as a CCD (Charge Coupled Device) image sensor, a CMOS (Complementary Metal Oxide Semiconductor) image sensor and the like has been made to have a high resolution, demands for an information device having an imaging function such as a digital still camera, a digital video camera, a mobile phone, a PDA (Personal Digital Assistant) and the like sharply increase. In the meantime, the information device having the image-capture function is referred as an imaging device.

Incidentally, regarding a focus control method of detecting a distance to a main subject and focusing on the subject, there are a contrast AF method and a phase difference AF (Auto Focus). Since the phase difference AF method can detect a focus position at higher speed and with higher precision, compared to the contrast AF method, it is adopted in various imaging devices (for example, refer to Patent Document 1).

FIG. 15 is a plan pictorial view of a general sensor that is used in the phase difference AF method.

The sensor shown in FIG. 15 has a first line on which pixels G1 having an optical opening a eccentric leftwards are arranged in a row direction and a second line on which pixels G2 having an optical opening a eccentric rightwards are arranged in the row direction.

In the sensor shown in FIG. 15, a case is considered in which a black line c extending in a vertical direction is put on pixels of 2 lines×4 columns in the middle and the black line c is in focus, as shown in FIG. 16. It is assumed that an output signal of the pixel covered by the black line c is "0" and an output signal of the pixel not covered by the black line c is "1". A graph that is formed by plotting the output signals of the pixels at the respective column positions is shown at the lower of FIG. 16. As shown in the graph, it is determined that a signal waveform of the pixels G1 and a signal waveform of the pixels G2 are completely matched and there is no phase difference. Like this, the sensor shown in FIG. 15 can correctly calculate phase difference information for the black line c extending in the vertical direction.

However, in the sensor shown in FIG. 15, when a black line d obliquely extending is put on, as shown in FIG. 17, false detection that there is a phase difference between the signal waveform of the pixels G1 and the signal waveform of the pixels G2 is made even though the black line d is in focus.

It is assumed that an output signal of the pixel of which the opening a is covered by the black line d is "0" and an output signal of the pixel of which the opening a is not covered by the black line d is "1". A graph that is formed by plotting the output signals of the pixels at the respective column positions is shown at the lower of FIG. 17. As shown in the graph, a deviation occurs between a signal waveform (the dashed-dotted line) of the pixels G1 and a signal waveform (the solid line) of the pixels G2. For this reason, it is determined that there is a phase difference, even though the black line d is in focus. Like this, the sensor shown in FIG. 15 may falsely detect the phase difference information for the black line d extending in the oblique direction.

Patent Document 1: Japanese Patent Application Publication No.: 2011-128302A

The invention has been made keeping in mind the above situations, and an object of the invention is to provide a solid-state image-capture element capable of maintaining phase difference detection precision, irrespective of a direction along which an edge of a subject extends, an imaging device having the same and a focus control method of the imaging device.

SUMMARY

A solid-state image-capture element of the invention includes a pair of a first phase difference detection pixel, which receives one of a pair of light beams passing through iris regions of different positions of an imaging optical system, and a second phase difference detection pixel, which receives the other of the pair of light beams, wherein the first phase difference detection pixel and the second phase difference detection pixel configuring the pair are arranged in a direction intersecting with a phase difference detection direction, wherein the pair includes at least one or a plurality of a first pair and a second pair, respectively, in which a positional relation of the first phase difference detection pixel and the second phase difference detection pixel is reverse to each other, and wherein the first pair and the second pair are arranged in the phase difference detection direction.

According to the invention, it is possible to provide a solid-state image-capture element capable of maintaining phase difference detection precision, irrespective of a direction along which an edge of a subject extends, an imaging device having the same and a focus control method of the imaging device.

DETAILED DESCRIPTION

Hereinafter, illustrative embodiments of the invention will be described with reference to the drawings.

Figure 1:
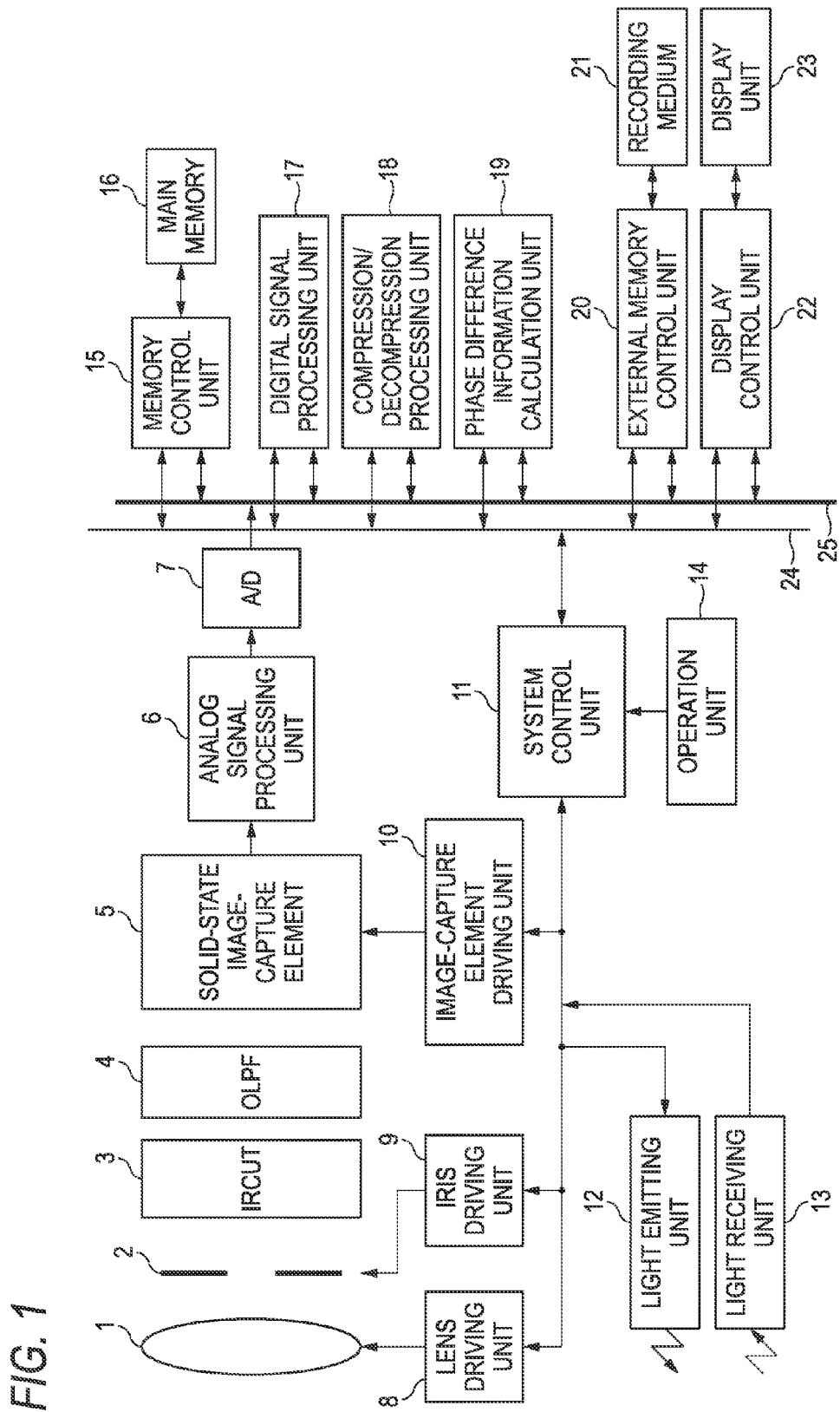
FIG. 1 shows a schematic configuration of a digital camera that is an imaging device for illustrating an illustrative embodiment of the invention.

FIG. 1 shows a schematic configuration of a digital camera that is an example of an imaging device for illustrating an illustrative embodiment of the invention.

An image-capture system of the shown digital camera has an imaging lens 1 that is an imaging optical system, a MOS-type solid-state image-capture element 5, an iris 2 provided between the lens and the image-capture element, an infrared cutoff filter 3 and an optical low-pass filter 4. The solid-state image-capture element 5 has a plurality of pixel lines on which a plurality of pixels is arranged in a horizontal direction, and is driven by a rolling shutter method of controlling signal readout timing every pixel line, as described below.

A system control unit 11 that integrally controls an entire electric control system of the digital camera controls a flash light emitting unit 12 and a light receiving unit 13. Also, the system control unit 11 controls a lens driving unit 8 to thus adjust a position of a focus lens included in the imaging lens 1 or a position of a zoom lens included in the imaging lens 1. Also, the system control unit 11 controls an opening amount of the iris 2 through an iris driving unit 9 to thereby adjust an exposure amount.

Also, the system control unit 11 drives the solid-state image-capture element 5 through an image-capture element driving unit 10 and outputs a subject image captured through the imaging lens 1, as a captured image signal. The system control unit 11 is input with an instruction signal of a user through an operation unit 14.

The electric control system of the digital camera further has an analog signal processing unit 6 that is connected to the output of the solid-state image-capture element 5 and performs analog signal processing such as correlated double sampling processing and an A/D conversion circuit 7 that converts color signals of RGB output from the analog signal processing unit 6 into digital signals. The analog signal processing unit 6 and the A/D conversion circuit 7 are controlled by the system control unit 11.

Also, the electric control system of the digital camera has a main memory 16, a memory control unit 15 that is connected to the main memory 16, a digital signal processing unit 17 that performs an interpolation calculation, a gamma correction calculation, an RGB/YC conversion processing and the like to thereby generate captured image data, a compression/decompression processing unit 18 that compresses the captured image data generated in the digital signal processing unit 17 into a JPEG format or decompresses the compressed image data, a phase difference information calculation unit 19 that calculates phase difference information by using image-capture signals read out from phase difference detection pixels included in the solid-state image-capture element 5, an external memory control unit 20 to which a detachable recording medium 21 is connected and a display control unit 22 to which a display unit 23 mounted to a backside of the camera is connected. The memory control unit 15, the digital signal processing unit 17, the compression/decompression processing unit 18, the phase difference information processing unit 19, the external memory control unit 20 and the display control unit 22 are connected to each other by a control bus 24 and a data bus 25 and are controlled by commands issued from the system control unit 11.

Figure 2:
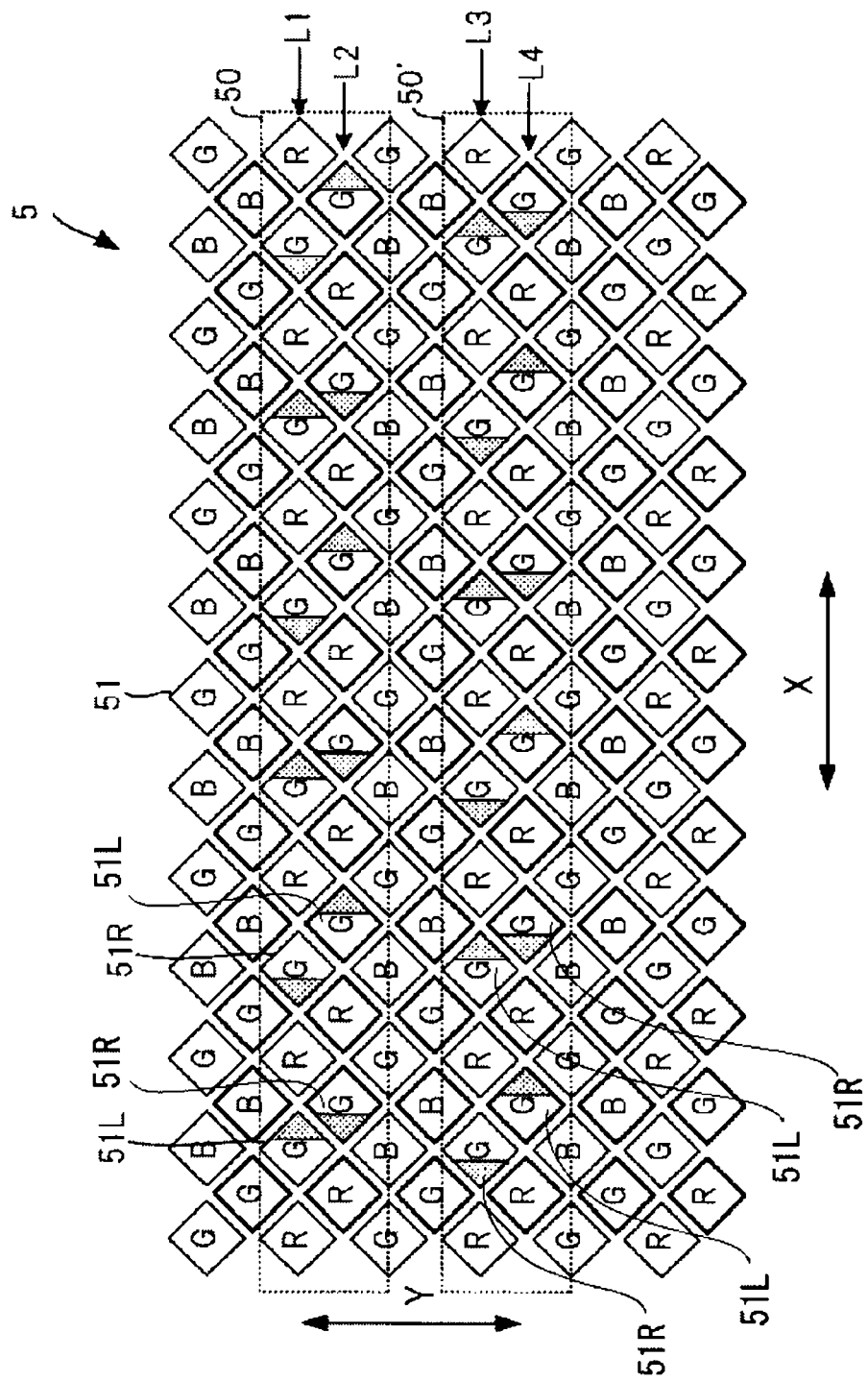
FIG. 2 is a plan pictorial view showing a schematic configuration of a solid-state image-capture element 5 that is mounted on the digital camera shown in FIG. 1.

FIG. 2 is a plan pictorial view showing a schematic configuration of the solid-state image-capture element 5 that is mounted to the digital camera shown in FIG. 1.

The solid-state image-capture element 5 has a plurality of pixels that is arranged in a two-dimensional shape in a row direction X and a column direction Y intersecting with the row direction. In the example of FIG. 2, the pixels are arranged in a so-called honeycomb shape in which an odd line and an even line of lines, each of which consists of a plurality of pixels lined up at a predetermined pitch in the row direction X, are deviated in the row direction X by a half of the pixel arrangement pitch on each line in the row direction X. Meanwhile, in FIG. 2, in order to easily distinguish the odd and even lines of the pixel lines, the pixels on the even line are shown with a bold line.

The pixels include an image-capture pixel 51, a phase difference detection pixels 51L and a phase difference detection pixel 51R.

The image-capture pixel 51 is a pixel that receives both of a pair of light beams passing through iris areas of different positions of the imaging lens 1 (light beams passing through the left and the right on the basis of a main axis of the imaging lens 1).

The phase difference detection pixel 51R is a pixel that receives one of the pair of light beams passing through iris areas of different positions of the imaging lens 1 (the light beam passing through one side (here, the right side) on the basis of the main axis of the imaging lens 1). In comparison to the image-capture pixel 51, a left end portion of an opening of a photoelectric conversion unit of the phase difference detection pixel 51R is light-shielded, so that an opening area of the photoelectric conversion unit is smaller. In FIG. 2, a hatched area of the phase difference detection pixel 51R is light-shielded and the opening of the photoelectric conversion unit of the phase difference detection pixel 51R is made to be eccentric rightwards.

The phase difference detection pixel 51L is a pixel that receives the other of the pair of light beams passing through iris areas of different positions of the imaging lens 1 (the light beam passing through the other side (here, the left side) on the basis of the main axis of the imaging lens 1). In comparison to the image-capture pixel 51, a right end portion of an opening of a photoelectric conversion unit of the phase difference detection pixel 51L is light-shielded, so that an opening area of the photoelectric conversion unit is smaller. In FIG. 2, a hatched area of the phase difference detection pixel 51L is light-shielded and the opening of the photoelectric conversion unit of the phase difference detection pixel 51L is made to be eccentric leftwards.

Color filters are formed above the photoelectric conversion units of the respective pixels on the odd lines of the pixels included in the solid-state image-capture element 5, and arrangement of the color filters is Bayer arrangement.

Also, color filters are formed above the photoelectric conversion units of the respective pixels on the even lines of the pixels included in the solid-state image-capture element 5, and arrangement of the color filters is also Bayer arrangement.

In FIG. 2, the pixel having a color filter (hereinafter, referred to as R filter) enabling red (R) light to pass therethrough is denoted with "R". Also, the pixel having a color filter (hereinafter, referred to as G filter) enabling green (G) light to pass therethrough is denoted with "G". Also, the pixel having a color filter (hereinafter, referred to as B filter) enabling blue (B) light to pass therethrough is denoted with "B".

By the above color filter arrangement, the pixel on the even line detecting the same color light as each pixel on the odd line is arranged at an oblique right-lower side with respect to each pixel on the odd line. By this configuration, an image captured on the odd line and an image captured on the even line are synthesized to improve the sensitivity and to change exposure time between the odd line and the even line and an image captured on the odd line and an image captured on the even line are synthesized to enlarge a dynamic range.

The solid-state image-capture element 5 has phase difference detection areas 50, 50" for calculating phase difference information.

The phase difference detection area 50 includes a line L1 and a line L2 adjacent thereto. On the line L1, the odd-numbered pixel from the left of the G filter-mounted pixels is the phase difference detection pixel 51L and the even-numbered pixel from the left is the phase difference detection pixel 51R. Also, on the line L2, the odd-numbered pixel from the left of the G filter-mounted pixels is the phase difference detection pixel 51R and the even-numbered pixel from the left is the phase difference detection pixel 51L.

In the phase difference detection area 50, each phase difference detection pixel 51L on the line L1 and each phase difference detection pixel 51R on the line L2 located in a direction (oblique right-lower direction) intersecting with the row direction X that is the phase difference detection direction as regards each phase difference detection pixel 51L configure a first pair. Also, in the phase difference detection area 50, each phase difference detection pixel 51R on the line L1 and each phase difference detection pixel 51L on the line L2 located in the direction (oblique right-lower direction) intersecting with the row direction X that is the phase difference detection direction as regards each phase difference detection pixel 51R configure a second pair. In this way, in the phase difference detection area 50, the first pair and the second pair are alternately arranged in the row direction X.

The phase difference detection area 50" includes a line L3 and a line L4. The line L3 has the same configuration as the line L1, except that the positions of the phase difference detection pixel 51R and the phase difference detection pixel 51L are reverse to each other. The line L4 has the same configuration as the line L2, except that the positions of the phase difference detection pixel 51R and the phase difference detection pixel 51L are reverse to each other. That is, in the phase difference detection areas 50, 50", the positional relations between the phase difference detection pixels 51R and the phase difference detection pixels 51L configuring the pairs are opposite to each other. That is, the phase difference detection pixels 51R and the phase difference detection pixels 51L are arranged in two patterns of an order of 51R and 51L and an order of 51L and 51R from a line upstream side towards a downstream side (from L1 towards L4). More specifically, in the phase difference detection area 50, the phase difference detection pixel 51R having an iris region of one location of iris regions of different locations in the image-capture pixel and the phase difference detection pixel 51L having an iris region of the other location are arranged in corresponding order from the line upstream side towards the downstream side. In the phase difference detection area 50", contrary to the phase difference detection area 50, the phase difference detection pixel 51L having an iris region of the other location and the phase difference detection pixel 51R having an iris region of one location are arranged in corresponding order.

In the phase difference detection area 50", each phase difference detection pixel 51L on the line L3 and each phase difference detection pixel 51R on the line L4 located in the direction (oblique right-lower direction) intersecting with the row direction X that is the phase difference detection direction as regards each phase difference detection pixel 51L configure a first pair. Also, in the phase difference detection area 50", each phase difference detection pixel 51R on the line L3 and each phase difference detection pixel 51L on the line L4 located in the direction (oblique right-lower direction) intersecting with the row direction X that is the phase difference detection direction as regards each phase difference detection pixel 51R configure a second pair. In this way, in the phase difference detection area 50", the first pair and the second pair are alternately arranged in the row direction X.

Subsequently, phase difference information calculation processing that is executed by the phase difference information calculation unit 19 of the digital camera shown in FIG. 1 is described.

The phase difference information calculation unit 19 performs the phase difference detection processing for each of the phase difference detection areas 50, 50", thereby calculating a phase difference amount (phase difference information) between an image captured in the phase difference detection pixel 51R and an image captured in the phase difference detection pixel 51L of each phase difference detection area.

Figure 3:
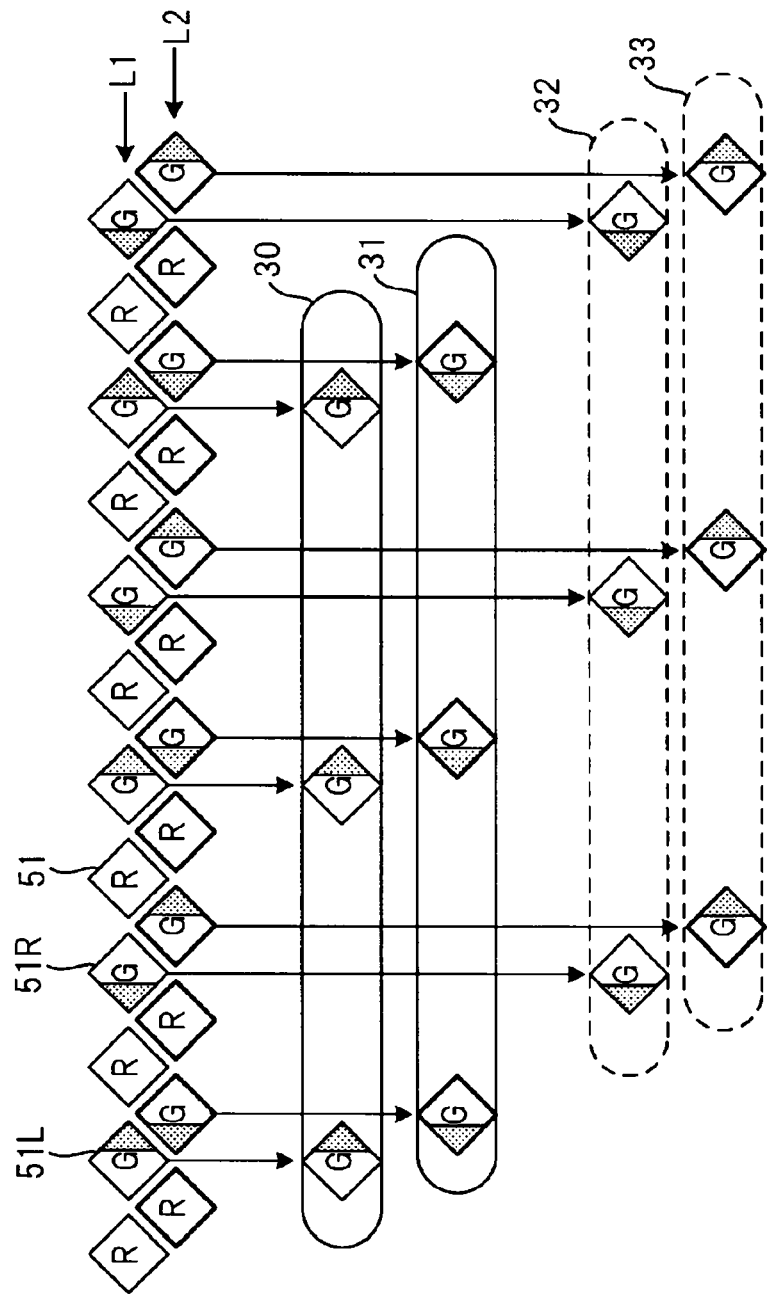
FIG. 3 illustrates phase difference information calculation processing that is performed by a phase difference information calculation unit 19.

FIG. 3 is a view for illustrating the phase difference information calculation processing that is executed by the phase difference information calculation unit 19.

The phase difference information calculation unit 19 performs a correlation calculation between a signal group 30, which is a signal group read out from each phase difference detection pixel 51L on the line L1, and a signal group 31, which is a signal group read out from each phase difference detection pixel 51R on the line L2, by a well-known method and thus calculates first phase difference information. The first phase difference information is a phase difference amount in the row direction X of a waveform of the signal group 31 on the basis of a waveform (a waveform that is obtained by plotting positions of the pixels of output sources of the respective signals configuring the signal group in the row direction X on a horizontal axis and plotting signal output levels of the respective pixels on a vertical axis) of the signal group 30.

Also, the phase difference information calculation unit 19 performs a correlation calculation between a signal group 32, which is a signal group read out from each phase difference detection pixel 51R on the line L1, and a signal group 33, which is a signal group read out from each phase difference detection pixel 51L on the line L2, by the well-known method and thus calculates second phase difference information. The second phase difference information is a phase difference amount in the row direction X of a waveform of the signal group 33 on the basis of a waveform of the signal group 32.

Here, from the solid-state image-capture element 5, an image-capture signal is read out by a rolling shutter method. That is, exposure is sequentially made from the uppermost line of FIG. 2 towards the lower line, so that an image-capture signal is read out from the solid-state image-capture element 5 in order from a line for which the exposure is over.

That is, signal readout timing deviates between the line L1 and the line L2. When imaging a subject moving at high speed, a distortion is caused in a subject image due to the deviation of the signal readout timing. For this reason, the first phase difference information includes an influence of the distortion in the subject image caused due to the rolling shutter method.

Also, signal readout timing deviates between the line L3 and the line L4. When imaging a subject moving at high speed, a distortion is caused in a subject image due to the deviation of the signal readout timing. For this reason, the second phase difference information includes an influence of the distortion in the subject image caused due to the rolling shutter method.

That is, the first phase difference information and the second phase difference information are expressed as follows.

(First Phase Difference Information)=(Phase Difference Amount $A1$ between Signal Group 30 and Signal Group 31)+(Distortion Influence Amount $A2$ between Signal Group 30 and Signal Group 31 Due to Rolling Shutter)

(Second Phase Difference Information)=(Phase Difference Amount $B1$ between Signal Group 32 and Signal Group 33)+(Distortion Influence Amount $B2$ between Signal Group 32 and Signal Group 33 Due to Rolling Shutter)

The signal group 30 and the signal group 32 shown in FIG. 3 are signals that are obtained from the line L1, and the signal group 31 and the signal group 33 are signals that are obtained from the line L2. For this reason, the distortion influence amount A2 and the distortion influence amount B2 are substantially the same. The reason to describe "substantially" is that the readout timing may be changed between an odd column and an even column even though the columns are on the same line. Also, a relation between the phase difference amount A1 and the phase difference amount B1 is substantially the same as the case where the deviation directions of the phases are opposite to each other and the signs thereof are reverse. In the below, the phase difference amount A1 is denoted with a plus sign and the phase difference amount B1 is denoted with a minus sign.

Thus, the phase difference information calculation unit 19 performs a following calculation to thus calculate phase difference information D corresponding to the phase difference detection area 50. As can be seen from a following equation, the phase difference information D little includes the distortion component caused due to the rolling shutter.

$$\text{(Phase Difference Information } D) =$$
$$\left(\begin{array}{l}\text{First Phase Difference Information}-\\ \text{Second Phase Difference Information}\end{array}\right)\!\Big/2 =$$
$$\left\{\begin{array}{l}\left(\begin{array}{l}\text{Phase Difference Amount } A1\,+\\ \text{Distortion Influence Amount } A2\end{array}\right)-\\ \left(\begin{array}{l}\text{Phase Difference Amount } B1\,+\\ \text{Distortion Influence Amount } B2\end{array}\right)\end{array}\right\}\!\Big/2 =$$
$$\left(\begin{array}{l}|\text{Phase Difference Amount } A1|\,+\\ |\text{Phase Difference Amount } B1|\end{array}\right)\!\Big/2$$

The phase difference information calculation unit 19 also calculates the phase difference information for the phase difference detection area 50" by the same method. That is, the phase difference information calculation unit 19 divides a value, which is obtained by subtracting the result of the correlation calculation between the signal group read out from the respective phase difference detection pixels 51R on the line L3 and the signal group read out from the respective phase difference detection pixels 51L on the line L4 from the result of the correlation calculation between the signal group read out from the respective phase difference detection pixels 51L on the line L3 and the signal group read out from the respective phase difference detection pixels 51R on the line L4, by 2, thereby calculating the phase difference information corresponding to the phase difference detection area 50". Meanwhile, in the above equation, it may be also possible to calculate the phase difference information by subtracting the first phase difference information from the second phase difference information and then dividing the result thereof by 2. In this case, although the sign of the phase difference amount is minus, it is possible to calculate a magnitude of the phase difference information without any problem.

Finally, the phase difference information calculation unit 19 calculates an average of the phase difference information corresponding to the phase difference detection area 50 and the phase difference information corresponding to the phase difference detection area 50", as final phase difference information, and transmits the phase difference information to the system control unit 11.

The system control unit 11 calculates a distance to the subject, based on the phase difference information received from the phase difference information calculation unit 19. Then, the system control unit 11 drives the imaging lens 1 through the lens driving unit 8, based on the distance, to thus control a position of the focus lens, thereby focusing on the subject.

In this way, according to the digital camera shown in FIG. 1, it is possible to prevent the calculation precision of the phase difference information from being lowered, which is caused due to the rolling shutter method, because the processing shown in FIG. 3 is executed.

Meanwhile, in the example of FIG. 2, the arrangements of the phase difference detection pixel 51L and the phase difference detection pixel 51R are opposite to each other between the phase difference detection area 50 and the phase difference detection area 50". However, even when the arrangements are made to be the same (the phase difference detection area 50 and the phase difference detection area 50" are configured to be the same), the above-described effects can be obtained. According to the configuration shown in FIG. 2, even when the signals are read out from only the respective phase difference detection pixels on the line L1 and the line L3 for the high-speed readout, for example, the phase difference information can be obtained by the correlation calculation between the signal group obtained from the line L1 and the signal group obtained from the line L3. For this reason, it is possible to increase the correlation calculation method for calculating the phase difference information, so that it is possible to perform a variety of calculations, depending on situations.

Also, in the example of FIG. 2, the solid-state image-capture element 5 has the phase difference detection area 50 and the phase difference detection area 50". However, when the solid-state image-capture element 5 has at least one of the phase difference detection area 50 and the phase difference detection area 50", it is possible to calculate the phase difference information by the phase difference information calculation unit 19. When the phase difference detection area 50 and the phase difference detection area 50" are provided in plural, respectively, the phase difference detection area 50 and the phase difference detection area 50" are preferably alternately arranged in the column direction Y.

Figure 4:
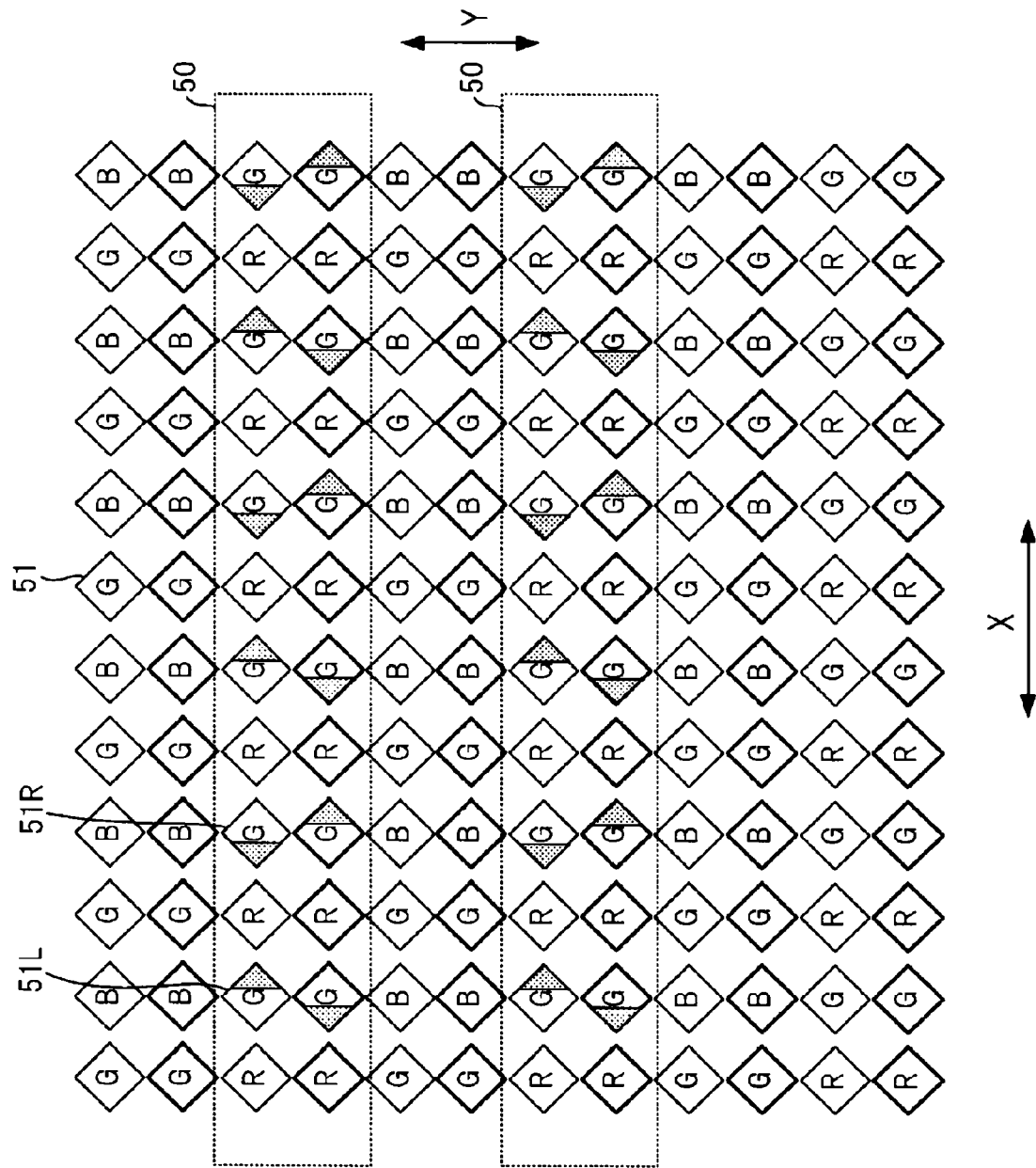
FIG. 4 shows a modified embodiment of the solid-state image-capture element 5 shown in FIG. 2.

Also, in the example of FIG. 2, the odd line and even line of the pixels are deviated in the row direction X. However, the invention is not limited thereto. For example, as shown in FIG. 4, the even line shown in FIG. 2 may be deviated leftwards by a half of the pixel arrangement pitch on each line. Meanwhile, FIG. 4 shows an example where the phase difference detection area 50 is provided instead of the phase difference detection area 50". Also in the solid-state image-capture element shown in FIG. 4, the phase difference information calculation unit 19 may calculate the phase difference information with high precision by performing the above-described processing for the phase difference detection area 50.

Also, according to the solid-state image-capture element 5 shown in FIG. 2 or the solid-state image-capture element shown in FIG. 4, the first pair consisting of the phase difference detection pixel 51L and the phase difference detection pixel 51R adjacent thereto and the second pair consisting of the phase difference detection pixel 51R and the phase difference detection pixel 51L adjacent thereto are alternately arranged in the row direction X in each phase difference detection area. For this reason, even when an inclined line focused on the phase difference detection area 50 or phase difference detection area 50" overlaps, a phase difference does not occur between an output signal waveform of the phase difference detection pixels having an opening eccentric leftwards and an output signal waveform of the phase difference detection pixels having an opening eccentric rightwards, which are obtained from the respective phase difference detection areas.

Figure 5:
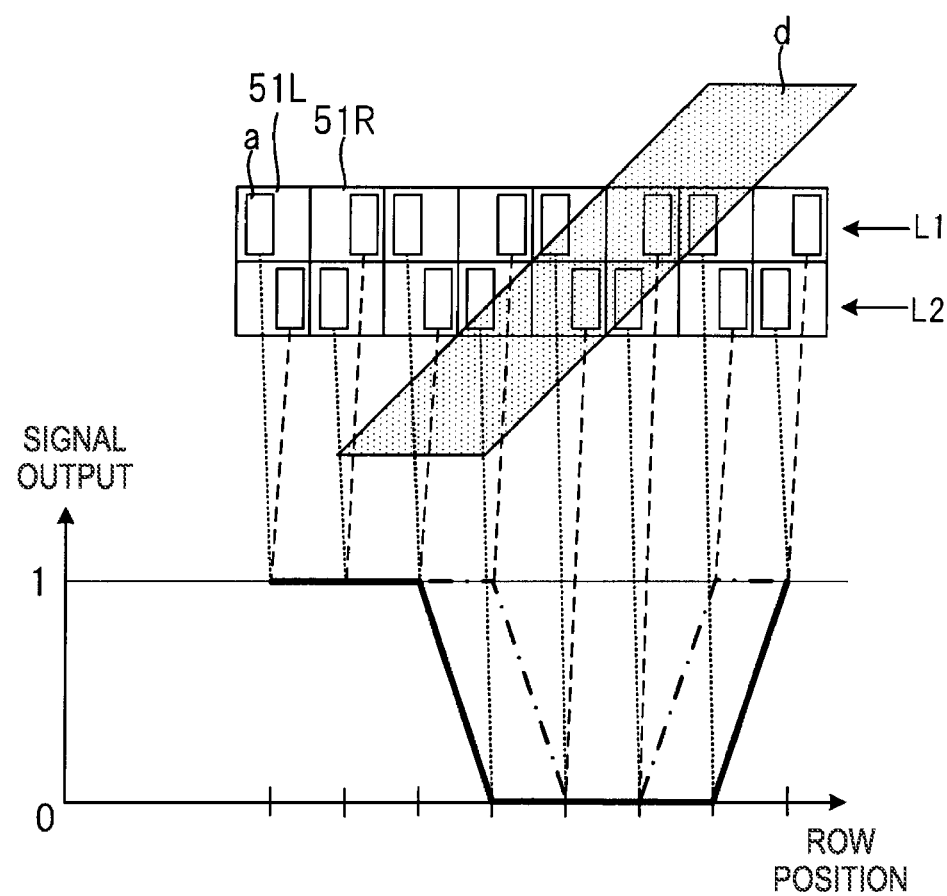
FIG. 5 shows that phase difference detection pixels, which are included in a phase difference detection area 50 in the solid-state image-capture element shown in FIG. 4, are extracted and arranged.

FIG. 5 shows that phase difference detection pixels, which are included in a phase difference detection area 50 in the solid-state image-capture element shown in FIG. 4, are extracted and arranged. In FIG. 5, a reference numeral a indicates the opening of the pixel.

As shown in FIG. 5, a case is considered in which a black line d obliquely extending is put on the phase difference detection pixels of 2 lines×8 columns and the black line d is in focus. It is assumed that an output signal of the pixel of which the opening a is covered by the black line d is "0" and an output signal of the pixel of which the opening a is not covered by the black line d is "1". A graph that is formed by plotting the output signals of the pixels on the respective column positions is shown at the lower of FIG. 5.

Figure 16:
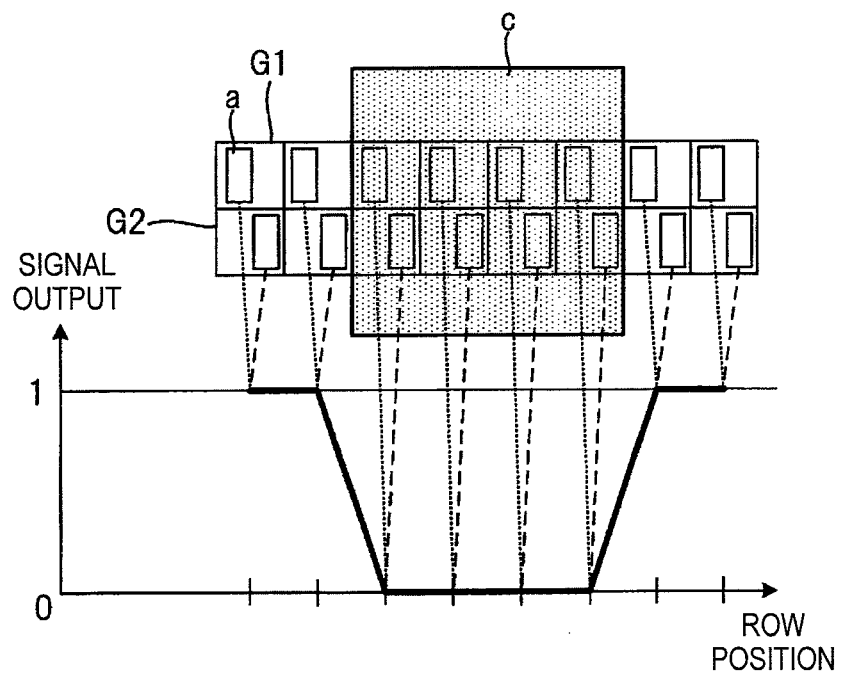
FIG. 16 illustrates a phase difference when a vertical line is put on the phase difference detection sensor of FIG. 15.
Figure 17:
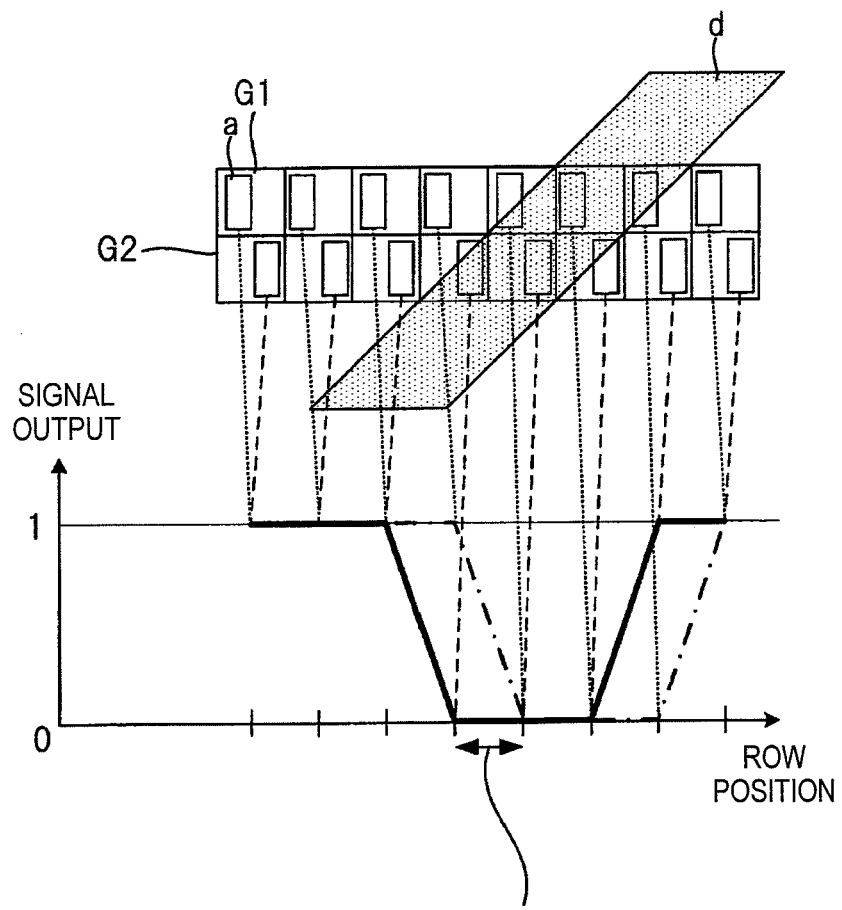
FIG. 17 illustrates a phase difference when an inclined line is put on the phase difference detection sensor of FIG. 15.

As shown in the graph of FIG. 5, a signal waveform (the thick solid line) of the phase difference detection pixels 51L and a signal waveform (the dashed-dotted line) of the phase difference detection pixels 51R have no phase difference although the shapes thereof are different. Also, in FIG. 5, when the black line extending in the column direction as shown in FIG. 16 is put on the eight phase difference detection pixels in the middle, for example, the signal waveform of the phase difference detection pixels 51L and the signal waveform of the phase difference detection pixels 51R are matched.

Like this, the solid-state image-capture element shown in FIG. 2 or 4 has at least one phase difference detection area in which the first pair and the second pair are alternately arranged in the row direction X. Therefore, even when an edge of a subject extending in the column direction Y or an edge of a subject extending in the oblique direction is put on the phase difference detection area and the edge is in focus, a phase difference is not caused between the output signal waveform of the phase difference detection pixels 51R and the output signal waveform of the phase difference detection pixels 51L read out from the phase difference detection area. Hence, it is possible to maintain the phase difference detection precision, irrespective of the direction along which the edge of the subject extends.

Also, the solid-state image-capture element shown in FIG. 2 or 4 has the phase difference detection area in which the first pair and the second pair are alternately arranged, so that the processing shown in FIG. 3 can be performed. For this reason, it is possible to prevent the phase difference detection precision from being lowered, which is caused due to the distortion influence of the rolling shutter.

Figure 6:
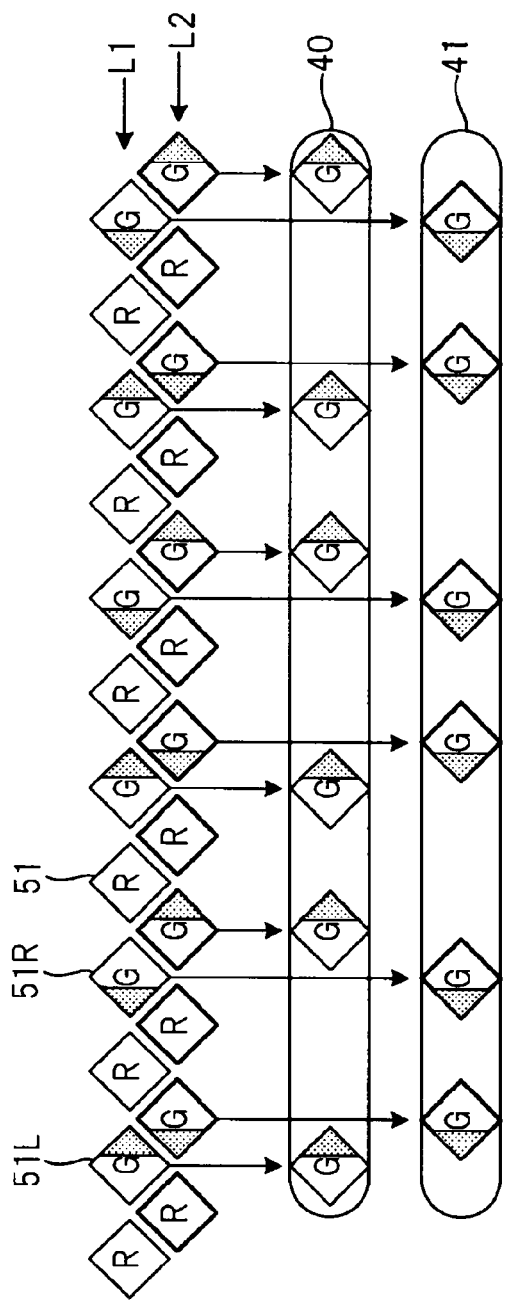
FIG. 6 illustrates a modified embodiment of the phase difference information calculation processing that is performed by the phase difference information calculation unit 19 of the digital camera having the solid-state image-capture element 5 shown in FIG. 2 mounted thereto.

FIG. 6 illustrates a modified embodiment of the phase difference information calculation processing that is performed by the phase difference information calculation unit 19 of the digital camera having the solid-state image-capture element 5 shown in FIG. 2 mounted thereto.

The phase difference information calculation unit 19 performs a correlation calculation between a signal group 40, which consists of signals read out from the phase difference detection pixels 51L on the line L1 and signals read out from the phase difference detection pixels 51L on the line L2, and a signal group 41, which consists of signals read out from the phase difference detection pixels 51R on the line L1 and signals read out from the phase difference detection pixels 51R on the line L2, thereby calculating phase difference information corresponding to the phase difference detection area 50. In the meantime, the column positions of the respective signals configuring the signal groups 40, 41 are not strictly located at an equal interval. However, since the phase difference detection pixels configuring the pair are arranged to be adjacent to each other, it can be considered that the column positions of the respective signals configuring the signal groups 40, 41 are located at a substantially equal interval.

By the processing shown in FIG. 6, it is possible to increase the number of signals included in the signal group for which the correlation calculation is performed, compared to the processing shown in FIG. 3. Therefore, it is possible to improve the calculation precision of the phase difference information for a high-frequency subject. Also, the processing described in FIG. 6 cannot exclude the distortion influence of the rolling shutter but can obtain the same effect of preventing the false detection of the phase difference as regards the inclined edge, which is described in FIG. 5.

The phase difference information calculation unit 19 may perform both the processing described in FIG. 3 and the processing described in FIG. 6.

For example, when it is presumed that the distortion influence of the rolling shutter is small, the phase difference information calculation unit 19 calculates the phase difference information by the processing described in FIG. 6, and when it is presumed that the distortion influence of the rolling shutter is large, the phase difference information calculation unit calculates the phase difference information by the processing described in FIG. 3.

Also, the phase difference information calculation unit 19 calculates the phase difference information in each of the processing described in FIG. 3 and the processing described in FIG. 6, and when it is presumed that the distortion influence of the rolling shutter is small, the phase difference information calculation unit transmits the phase difference information calculated by the processing described in FIG. 6 to the system control unit 11, and when it is presumed that the distortion influence of the rolling shutter is large, the phase difference information calculation unit transmits the phase difference information calculated by the processing described in FIG. 3 to the system control unit 11.

For example, when an AF area has a size of a predetermined threshold or larger, the phase difference information calculation unit 19 presumes that the distortion influence of the rolling shutter is large, and when an AF area is smaller than the threshold, the phase difference information calculation unit presumes that the distortion influence of the rolling shutter is small. Here, the AF area is a focusing area and may be configured so that the digital camera of FIG. 1 can arbitrarily set a position or size thereof by a user of the camera or so that a size of the AF area is set depending on an imaging mode. When the AF area is not so large, the number of phase difference detection areas included in the AF area is small. As a result, the number of phase difference detection pixels, from which the signals are read out, is also small. For this reason, it is considered that the distortion influence of the rolling shutter is small.

Also, it is thought that the influence of the rolling shutter is larger as a subject distance in an imaging field angle becomes longer. Hence, when the subject distance is a threshold or larger, the phase difference information calculation unit 19 may presume that distortion influence of the rolling shutter is large, and when the subject distance is shorter than the threshold, the phase difference information calculation unit may presume that distortion influence of the rolling shutter is small.

Also, the distortion due to the rolling shutter occurs when there is a moving object in the imaging field angle. Hence, when a moving object is detected in the AF area and there is a moving object in the AF area, the phase difference information calculation unit 19 may presume that distortion influence of the rolling shutter is large, and when there is no moving object in the AF area, the phase difference information calculation unit may presume that distortion influence of the rolling shutter is small.

In this way, the distortion influence of the rolling shutter is presumed on the basis of at least one of the imaging condition such as the size of the AF area and the like and the subject condition such as the subject distance, the movement of the subject and the like. As a result, when it is presumed that the distortion influence of the rolling shutter is small, the system control unit 11 performs the focus control based on the phase difference information obtained in the processing of FIG. 6. When it is presumed that the distortion influence of the rolling shutter is large, the system control unit 11 performs the focus control based on the phase difference information obtained in the processing of FIG. 3. Thereby, it is possible to improve the phase difference detection precision and to improve the phase difference detection precision for a high-frequency subject.

In the meantime, the phase difference information calculation unit 19 may perform only the processing shown in FIG. 6. Also in this case, it is possible to obtain the effect of preventing the false detection of the phase difference as regards the inclined edge. When the phase difference information calculation unit 19 performs only the processing shown in FIG. 6, at least one of each of the first pair and the second pair should be included in the phase difference detection areas 50, 50" of the solid-state image-capture element 5 shown in FIG. 2. Also, when the phase difference information calculation unit 19 performs only the processing shown in FIG. 3, at least two of each of the first pair and the second pair should be included in the phase difference detection areas 50, 50" of the solid-state image-capture element 5 shown in FIG. 2.

Also, when the phase difference information calculation unit 19 performs only the processing shown in FIG. 6 (without performing the processing shown in FIG. 3), the solid-state image-capture element 5 that is mounted to the digital camera shown in FIG. 1 is not limited to the MOS type and may adopt a CCD type.

Figure 7:
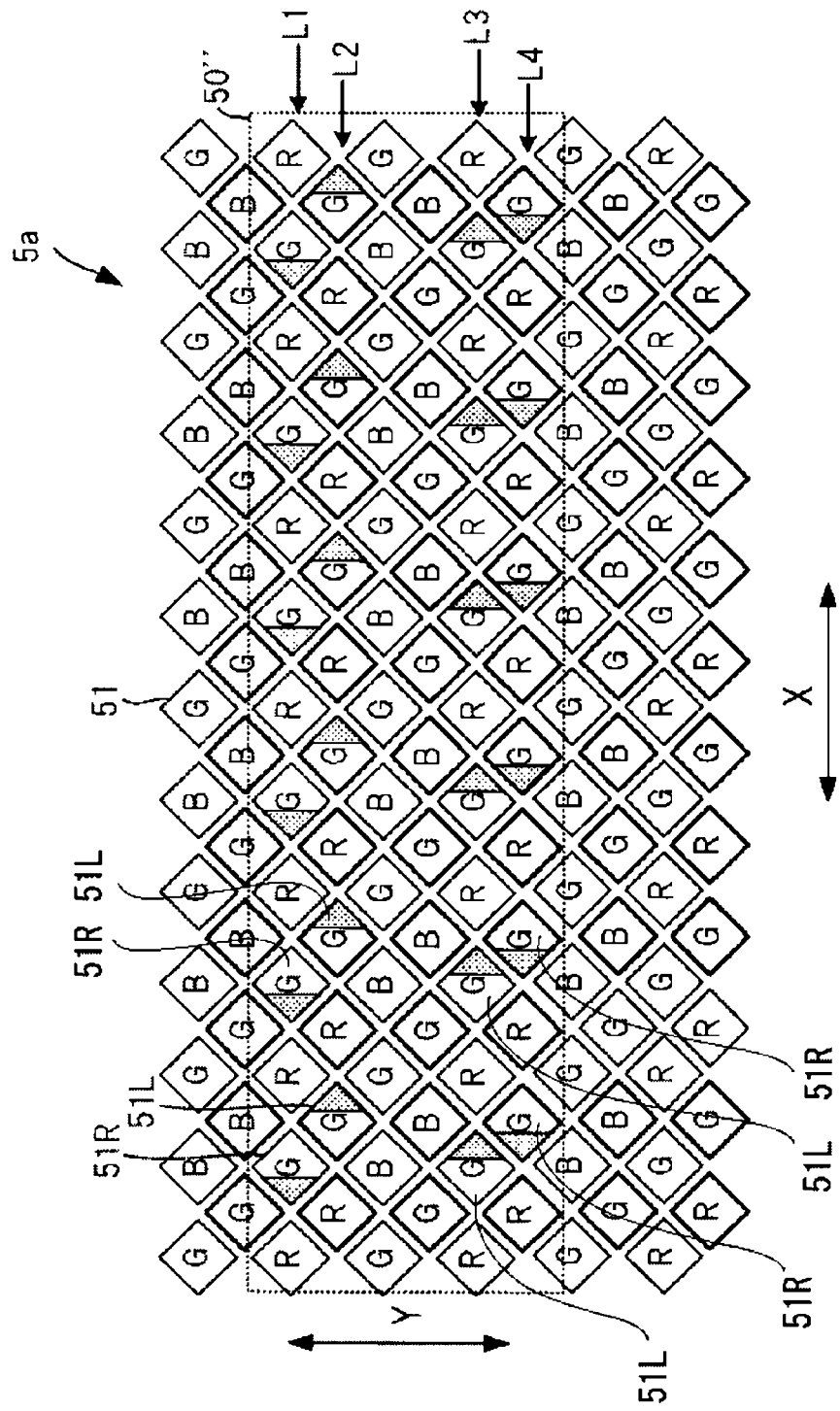
FIG. 7 is a plan pictorial view of a solid-state image-capture element 5a that is a modified embodiment of the solid-state image-capture element 5 shown in FIG. 2.

FIG. 7 is a plan pictorial view of a solid-state image-capture element 5a that is a modified embodiment of the solid-state image-capture element 5 shown in FIG. 2.

The solid-state image-capture element 5a shown in FIG. 7 has the same configuration as the solid-state image-capture element 5, except that the odd phase difference detection pixel 51L from the left on the line L1 of FIG. 2 is changed to the phase difference detection pixel 51R, the odd phase difference detection pixel 51R from the left on the line L2 of FIG. 2 is changed to the phase difference detection pixel 51L, the odd phase difference detection pixel 51R from the left on the line L3 of FIG. 2 is changed to the phase difference detection pixel 51L and the odd phase difference detection pixel 51L from the left on the line L4 of FIG. 2 is changed to the phase difference detection pixel 51R.

The solid-state image-capture element 5a has at least one phase difference detection area 50" including the lines L1, L2, L3, L4.

The phase difference information calculation unit 19 of the digital camera having the solid-state image-capture element 5a mounted thereto calculates the phase difference information corresponding to the phase difference detection area 50", as follows.

Figure 8:
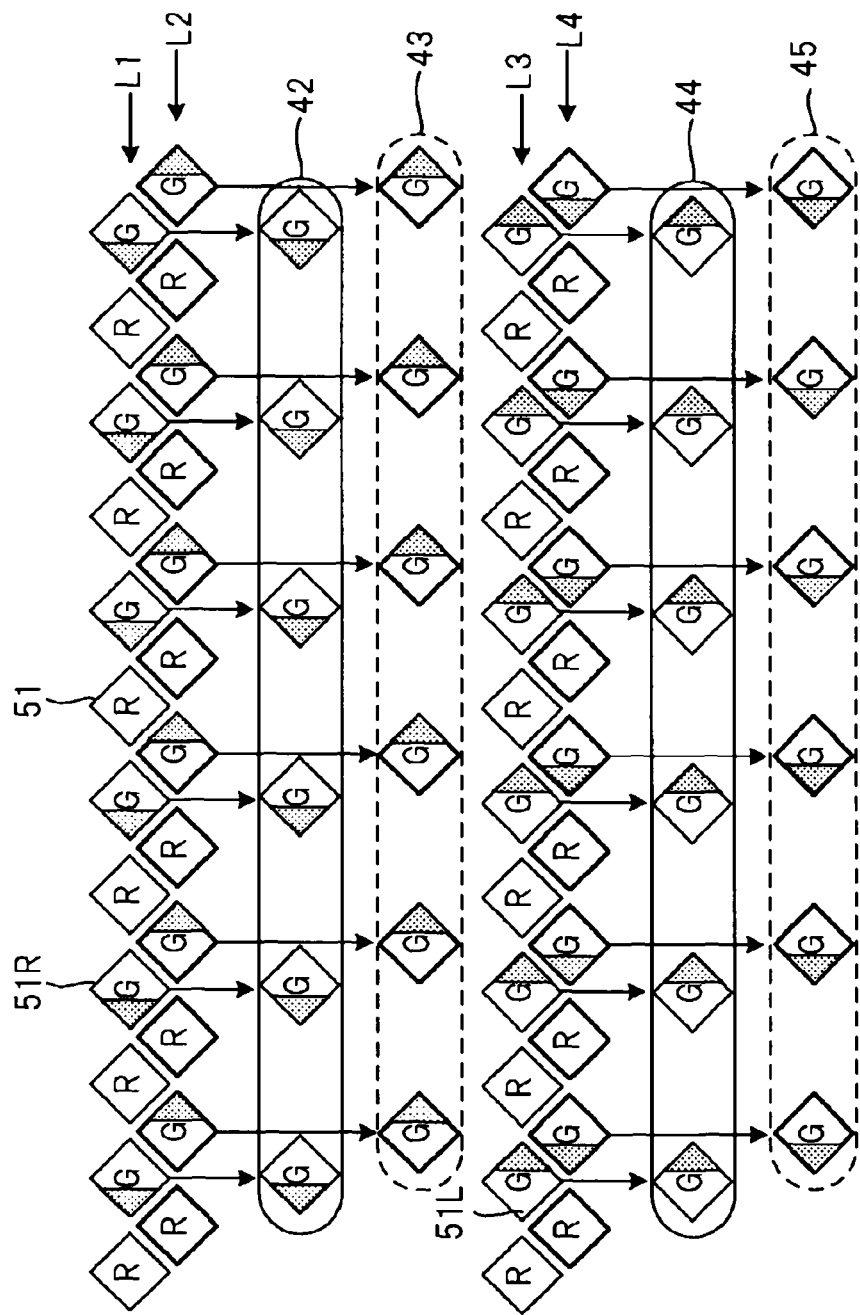
FIG. 8 illustrates the phase difference information calculation processing that is performed by the phase difference information calculation unit 19 of the digital camera having the solid-state image-capture element 5a shown in FIG. 7 mounted thereto.

FIG. 8 illustrates the phase difference information calculation processing that is performed by the phase difference information calculation unit 19 of the digital camera having the solid-state image-capture element 5a shown in FIG. 7 mounted thereto.

The phase difference information calculation unit 19 performs a correlation calculation between a signal group 42, which is read out from the phase difference detection pixels 51R on the line L1, and a signal group 44, which is read out from the phase difference detection pixels 51L on the line L3, thereby calculating third phase difference information.

Also, the phase difference information calculation unit 19 performs a correlation calculation between a signal group 43, which is read out from the phase difference detection pixels 51L on the line L2, and a signal group 45, which is read out from the phase difference detection pixels 51R on the line L4, thereby calculating fourth phase difference information.

Signal readout timing deviates between the line L1 and the line L3 by four lines. Therefore, the third phase difference information includes an influence of the distortion in a subject image caused due to the rolling shutter method.

Signal readout timing deviates between the line L2 and the line L4 by four lines. Therefore, the fourth phase difference information includes an influence of the distortion in a subject image caused due to the rolling shutter method.

That is, the third phase difference information and the fourth phase difference information are expressed as follows.

(Third Phase Difference Information)=(Phase Difference Amount $C1$ between Signal Group 42 and Signal Group 44)+(Distortion Influence Amount $C2$ between Signal Group 42 and Signal Group 44 Due to Rolling Shutter)

(Fourth Phase Difference Information)=(Phase Difference Amount $D1$ between Signal Group 43 and Signal Group 45)+(Distortion Influence Amount $D2$ between Signal Group 43 and Signal Group 45 Due to Rolling Shutter)

In the above equations, the distortion influence amount $C2$ and the distortion influence amount $D2$ are substantially matched. Also, the phase difference amount $C1$ and the phase difference amount $D1$ have signs that are reverse to each other. In the below, the phase difference amount $C1$ is denoted with a plus sign and the phase difference amount $D1$ is denoted with a minus sign.

Thus, the phase difference information calculation unit 19 performs a following calculation to thus calculate phase difference information E corresponding to the phase difference detection area 50". As can be seen from a following equation, the phase difference information E little includes the distortion component caused due to the rolling shutter.

$$\text{(Phase Difference Information } E) =$$

$$\left( \begin{array}{c} \text{Third Phase Difference Information} - \\ \text{Fourth Phase Difference Information} \end{array} \right) \Big/ 2 =$$

$$\left\{ \begin{array}{c} \left( \begin{array}{c} \text{Phase Difference Amount } C1 + \\ \text{Distortion Influence Amount } C2 \end{array} \right) - \\ \left( \begin{array}{c} \text{Phase Difference Amount } D1 + \\ \text{Distortion Influence Amount } D2 \end{array} \right) \end{array} \right\} \Big/ 2 =$$

$$\left( \begin{array}{c} |\text{Phase Difference Amount } C1| + \\ |\text{Phase Difference Amount } D1| \end{array} \right) \Big/ 2$$

When the solid-state image-capture element 5a has a plurality of the phase difference detection areas 50", the phase difference information calculation unit 19 calculates (for example, averages) the phase difference information corresponding to each of the phase difference detection areas 50", thereby calculating final phase difference information. Then, the phase difference information calculation unit transmits the phase difference information to the system control unit 11.

The system control unit 11 calculates a distance to the subject, based on the phase difference information received from the phase difference information calculation unit 19. Then, the system control unit 11 drives the imaging lens 1 through the lens driving unit 8, based on the distance, to thus control a position of the focus lens, thereby focusing on the subject.

Like this, even with the same configuration as the solid-state image-capture element 5a, it is possible to prevent the calculation precision of the phase difference information from being lowered, which is caused due to the rolling shutter method, by performing the processing described in FIG. 8.

Meanwhile, in FIG. 7, even with a configuration in which the phase difference detection pixel 51R on the line L1 is changed to the phase difference detection pixel 51L, the phase difference detection pixel 51L on the line L2 is changed to the phase difference detection pixel 51R, the phase difference detection pixel 51L on the line L3 is changed to the phase difference detection pixel 51R and the phase difference detection pixel 51R on the line L4 is changed to the phase difference detection pixel 51L, it is possible to obtain the same effect by performing the processing described in FIG. 8.

Also, in FIG. 7, even with a configuration in which the odd line and even line of the pixels are not deviated in the row direction X (even with the same pixel arrangement as FIG. 4), it is possible to obtain the same effect.

Also, according to the solid-state image-capture element 5a shown in FIG. 7, a first pair line on which a plurality of the first pairs, each of which consists the phase difference detection pixel 51R and the phase difference detection pixel 51L adjacent thereto at the right-lower side, is arranged in the row direction X and a second pair line on which a plurality of the second pairs, each of which consists the phase difference detection pixel 51L and the phase difference detection pixel 51R adjacent thereto at the right-lower side, is arranged in the row direction X are arranged in the column direction Y. For this reason, even when the inclined line focused on the phase difference detection area 50" overlaps, a phase difference does not occur between an output signal waveform of the phase difference detection pixels having an opening eccentric leftwards and an output signal waveform of the phase difference detection pixels having an opening eccentric rightwards, which are obtained from the lines L1 to L4.

Figure 9:
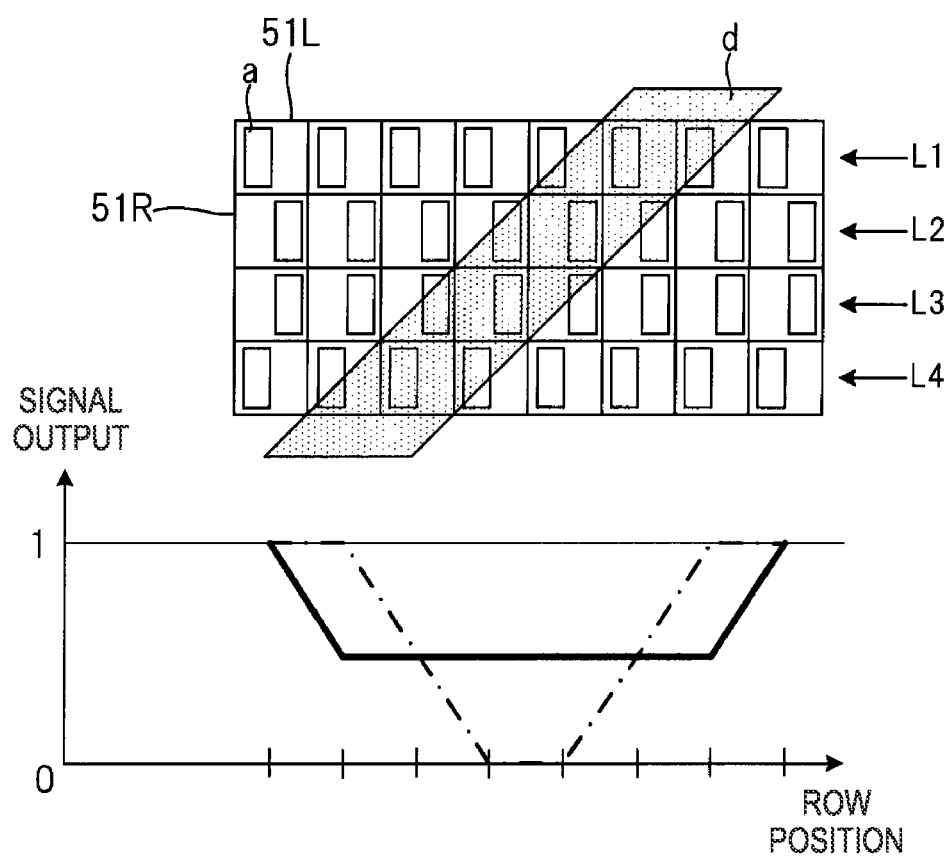
FIG. 9 shows that phase difference detection pixels, which are included on lines L1 to L4 in the solid-state image-capture element shown in FIG. 7, are extracted and arranged.

FIG. 9 shows that the phase difference detection pixels, which are included on the lines L1 to L4 in the solid-state image-capture element shown in FIG. 7, are extracted and arranged. In the meantime, it can be regarded that the column positions of the phase difference detection pixels configuring the pairs in the solid-state image-capture element 5a shown in FIG. 7 are substantially the same. Therefore, it is shown in FIG. 9 that the positions of the phase difference detection pixels on the respective lines L1 to L4 are matched in the row direction X. Also, in FIG. 9, the reference numeral a indicates an opening of the pixel.

As shown in FIG. 9, a case is considered in which a black line d extending in the oblique direction is put on the phase difference detection pixels of 4 lines×8 columns and the black line d is in focus. It is assumed that an output signal of the pixel having an opening a covered by the black line d is "0" and an output signal of the pixel having an opening not covered by the black line d is "1". A graph that is formed by plotting average values of the output signals of the pixels having the same eccentricity direction and located at the respective column positions is shown at the lower of FIG. 9.

As shown in the graph of FIG. 9, a signal waveform (the thick solid line) of the phase difference detection pixels 51L and a signal waveform (the dashed-dotted line) of the phase difference detection pixels 51R have no phase difference although the shapes thereof are different. Also, in FIG. 9, when the black line extending in the column direction as shown in FIG. 16 is put on the eight phase difference detection pixels in the middle, for example, the signal waveform of the phase difference detection pixels 51L and the signal waveform of the phase difference detection pixels 51R are matched.

Like this, the solid-state image-capture element 5a shown in FIG. 7 has at least one phase difference detection area in which the first pair line and the second pair line are arranged in the column direction Y. Therefore, even when an edge of a subject extending in the column direction Y or an edge of a subject extending in the oblique direction is put on the phase difference detection area and the edge is in focus, a phase difference is not caused between the output signal waveform of the phase difference detection pixels 51R and the output signal waveform of the phase difference detection pixels 51L read out from the phase difference detection area. Hence, it is possible to maintain the phase difference detection precision, irrespective of the direction along which the edge of the subject extends.

Also, the solid-state image-capture element 5a shown in FIG. 7 has the phase difference detection area, so that the processing shown in FIG. 8 can be performed. For this reason, it is possible to prevent the phase difference detection precision from being lowered, which is caused due to the distortion influence of the rolling shutter.

On the other hand, instead of performing the processing described in FIG. 8, the phase difference information calculation unit 19 may perform separate processing of calculating, as the phase difference information corresponding to the phase difference detection area 50", a result of the correlation calculation between the signal group (corresponding to the dashed-dotted line in FIG. 9), which consists of average values of the output signals of the respective phase difference detection pixels 51R on the line L1 and the phase difference detection pixels 51R of the line L4 in the right pixel columns adjacent to the respective phase difference detection pixels 51R, and the signal group (corresponding to the thick solid line in FIG. 9), which consists of average values of the output signals of the respective phase difference detection pixels 51L on the line L2 and the phase difference detection pixels 51L of the line L3 in the left pixel columns adjacent to the respective phase difference detection pixels 51L. In this case, it is not possible to reduce the distortion influence of the rolling shutter. However, as described in FIG. 9, it is possible to obtain the effect of preventing the false detection of the phase difference as regards the inclined edge.

In the meantime, in order to calculate the phase difference information by performing the processing described in FIG. 8 or the separate processing, at least one of each of the first pair line and the second pair line should be included in the phase difference detection area 50" of the solid-state image-capture element 5a shown in FIG. 7.

Also, when the phase difference information calculation unit 19 performs only the separate processing without performing the processing shown in FIG. 8, the solid-state image-capture element 5a is not limited to the MOS type and may adopt a CCD type.

Also, the phase difference information calculation unit 19 may execute both the processing shown in FIG. 8 and the separate processing. In this case, as described above, the system control unit 11 may perform the focus control on the basis of at least one of the imaging condition and the subject condition by using the phase difference information calculated by the processing shown in FIG. 8 and the phase difference information calculated by the separate processing.

Figure 10:
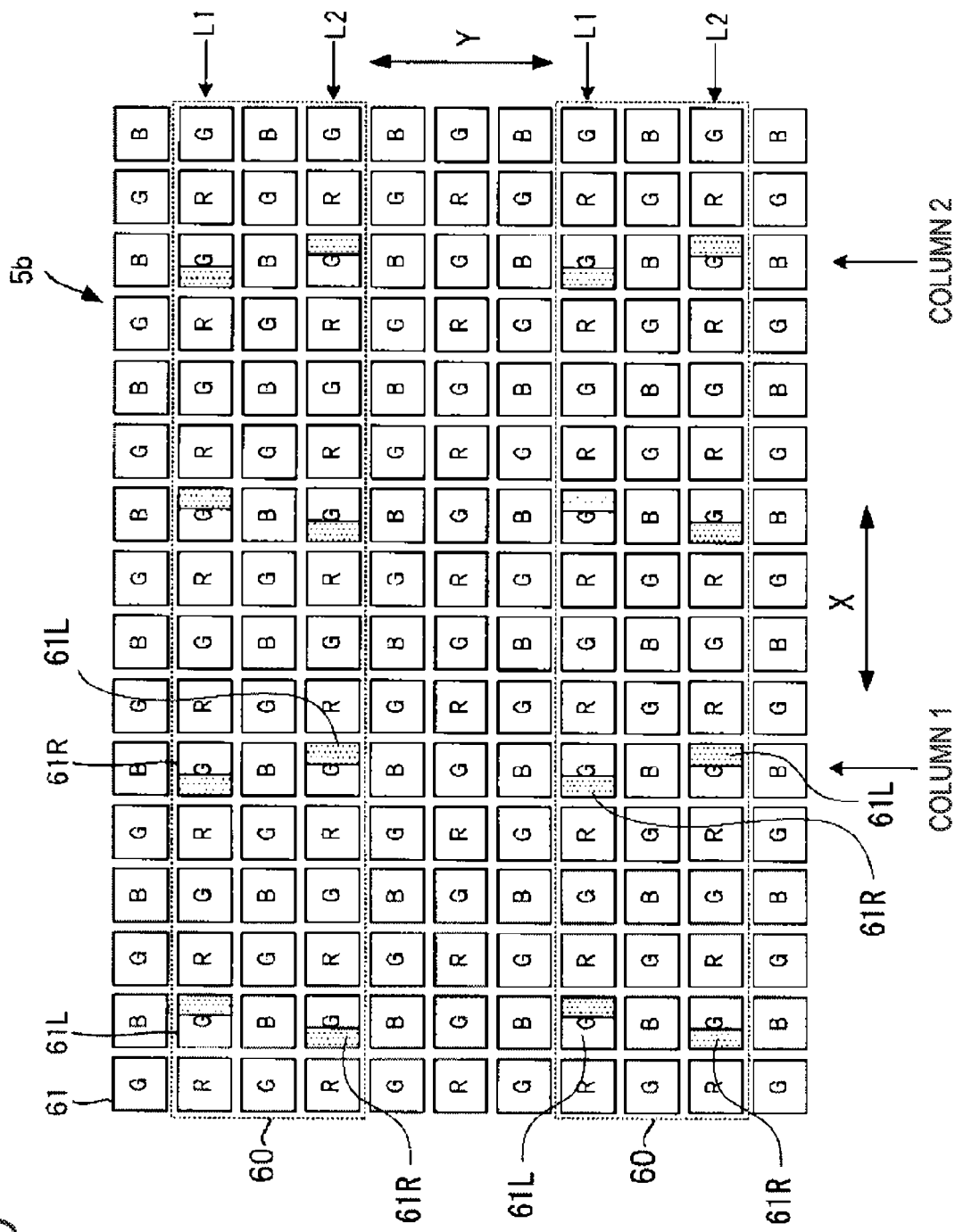
FIG. 10 is a plan pictorial view of a solid-state image-capture element 5b that is a modified embodiment of the solid-state image-capture element 5 mounted to the digital camera shown in FIG. 1.

FIG. 10 is a plan pictorial view of a solid-state image-capture element 5b that is a modified embodiment of the solid-state image-capture element 5 mounted to the digital camera shown in FIG. 1.

The solid-state image-capture element 5b has a plurality of pixels (each of which has a square shape in FIG. 10) arranged in a square lattice shape in the row direction X and in the column direction Y. The basic configuration of the pixels is the same as each pixel of the solid-state image-capture element 5 shown in FIG. 2.

Color filters are formed above the photoelectric conversion units included in the respective pixels and arrangement of the color filters is Bayer arrangement in the entire pixels. In FIG. 10, the letters "R, G, B" denoted in the respective pixels indicate colors of the color filters mounted on the pixels.

The pixels include an image-capture pixel 61 having the same configuration as the image-capture pixel 51 of FIG. 2, a phase difference detection pixel 61L having the same configuration as the phase difference detection pixel 51L of FIG. 2 and a phase difference detection pixel 61R having the same configuration as the phase difference detection pixel 51R of FIG. 2. The solid-state image-capture element 5b has a phase difference detection area 60, and the phase difference detection pixel 61L and the phase difference detection pixel 61R are included in the phase difference detection area 60.

The phase difference detection pixel 61L and the phase difference detection pixel 61R are alternately arranged at an equal interval on the first line L1 from the top of the three lines in the phase difference detection area 60.

Also, the phase difference detection pixel 61R and the phase difference detection pixel 61L are alternately arranged at an equal interval on the third line L2 from the top of the lines in the phase difference detection area 60.

On the line L1 and the line L2, positions at which the phase difference detection pixels are arranged are matched in the row direction X. Each phase difference detection pixel 61L on the line L1 and each phase difference detection pixel 61R on the line L2 located next to the line L1 in the column direction Y configure a first pair. Also, each phase difference detection pixel 61R on the line L1 and each phase difference detection pixel 61L on the line L2 located next to the line L1 in the column direction Y configure a second pair.

In this way, the first pair and the second pair are alternately arranged in the row direction X in the phase difference detection area 60.

The solid-state image-capture element 5b has preferably at least one phase difference detection area 60.

According to the solid-state image-capture element 5b configured as described above, since the arrangement of the phase difference detection pixels in the phase difference detection area 60 is the same as that shown in FIG. 5, it is possible to prevent the phase difference detection precision from being lowered, which is caused due to the inclined edge of the subject.

Also, the phase difference information calculation unit 19 of FIG. 1 can suppress the distortion influence of the rolling shutter by subtracting the correlation calculation result between the signals read out from the respective phase difference detection pixels 61R on the line L1 and the signals read out from the respective phase difference detection pixels 61L on the line L2 from the correlation calculation result between the signals read out from the respective phase difference detection pixels 61L on the line L1 and the signals read out from the respective phase difference detection pixels 61R on the line L2 to thereby calculate the phase difference information corresponding to the phase difference detection area 60 (i.e., by performing the same processing as those described in FIG. 3).

In the meantime, when the phase difference information calculation unit 19 performs the same processing as those described in FIG. 3, the arrangement interval of the phase difference detection pixels 61L and the arrangement interval of the phase difference detection pixels 61R on the lines L1, L2 in the phase difference detection area 60 are preferably equal, respectively, and an interval between the phase difference detection pixel 61L and the phase difference detection pixel 61R is not necessarily equal.

For example, the respective phase difference detection pixels on a column 1 and a column 2 shown in FIG. 10 may be deviated leftwards by two pixels. Even with this configuration, since an interval of the column positions between the signal read out from the phase difference detection pixel 61L on the line L1 and the signal read out from the phase difference detection pixel 61R on the line L2 is equal and an interval of the column positions between the signal read out from the phase difference detection pixel 61R on the line L1 and the signal read out from the phase difference detection pixel 61L on the line L2 is equal, it is possible to perform the correlation calculation without any difficulty. Like this, when the processing of FIG. 3 is performed, it is not necessary to make the arrangement interval of the phase difference detection pixels equal, so that it is possible to increase the degree of design freedom of the solid-state image-capture element.

Figure 11:
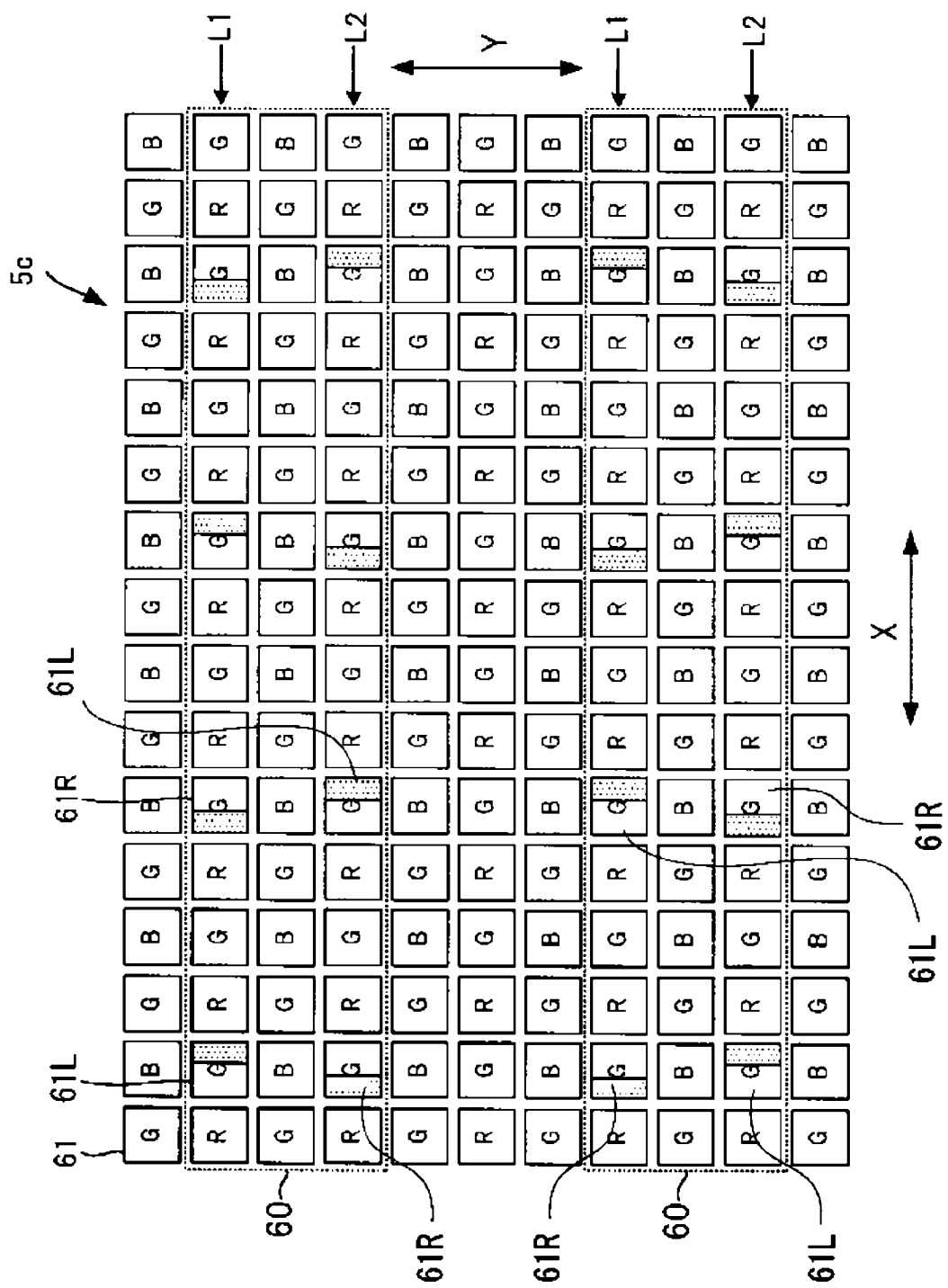
FIG. 11 is a plan pictorial view of a solid-state image-capture element 5c that is a modified embodiment of the solid-state image-capture element 5 mounted to the digital camera shown in FIG. 1.

FIG. 11 is a plan pictorial view of a solid-state image-capture element 5c that is a modified embodiment of the solid-state image-capture element 5 mounted to the digital camera shown in FIG. 1. In the solid-state image-capture element 5c, the phase difference detection pixel 61L and the phase difference detection pixel 61R in the lower phase difference detection area 60 of the two phase difference detection areas 60 shown in FIG. 10 are reversely arranged.

Figure 12:
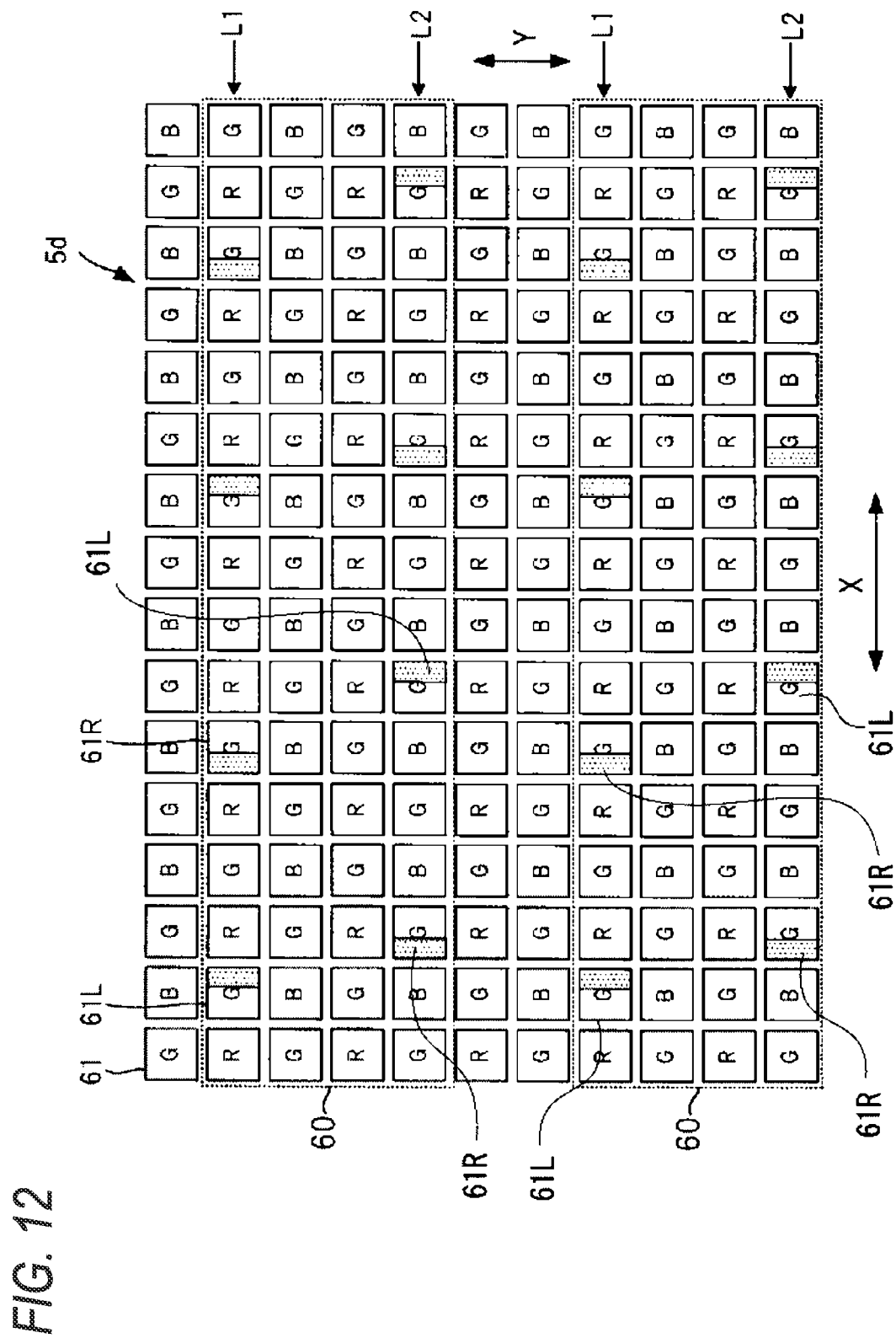
FIG. 12 is a plan pictorial view of a solid-state image-capture element 5d that is a modified embodiment of the solid-state image-capture element 5 mounted to the digital camera shown in FIG. 1.

FIG. 12 is a plan pictorial view of a solid-state image-capture element 5d that is a modified embodiment of the solid-state image-capture element 5 mounted to the digital camera shown in FIG. 1. In the solid-state image-capture element 5d, the positions of the respective phase difference detection pixels on the line L2 of each phase difference detection area 60 shown in FIG. 10 are changed to positions of the G filter-mounted image-capture pixels 61 located at the right-lower side thereof. Like this, even when the column position of each phase difference detection pixel on the line L1 and the column position of each phase difference detection pixel on the line L2 deviate from each other, it is possible to obtain the same effect as the solid-state image-capture element 5a shown in FIG. 10.

Figure 13:
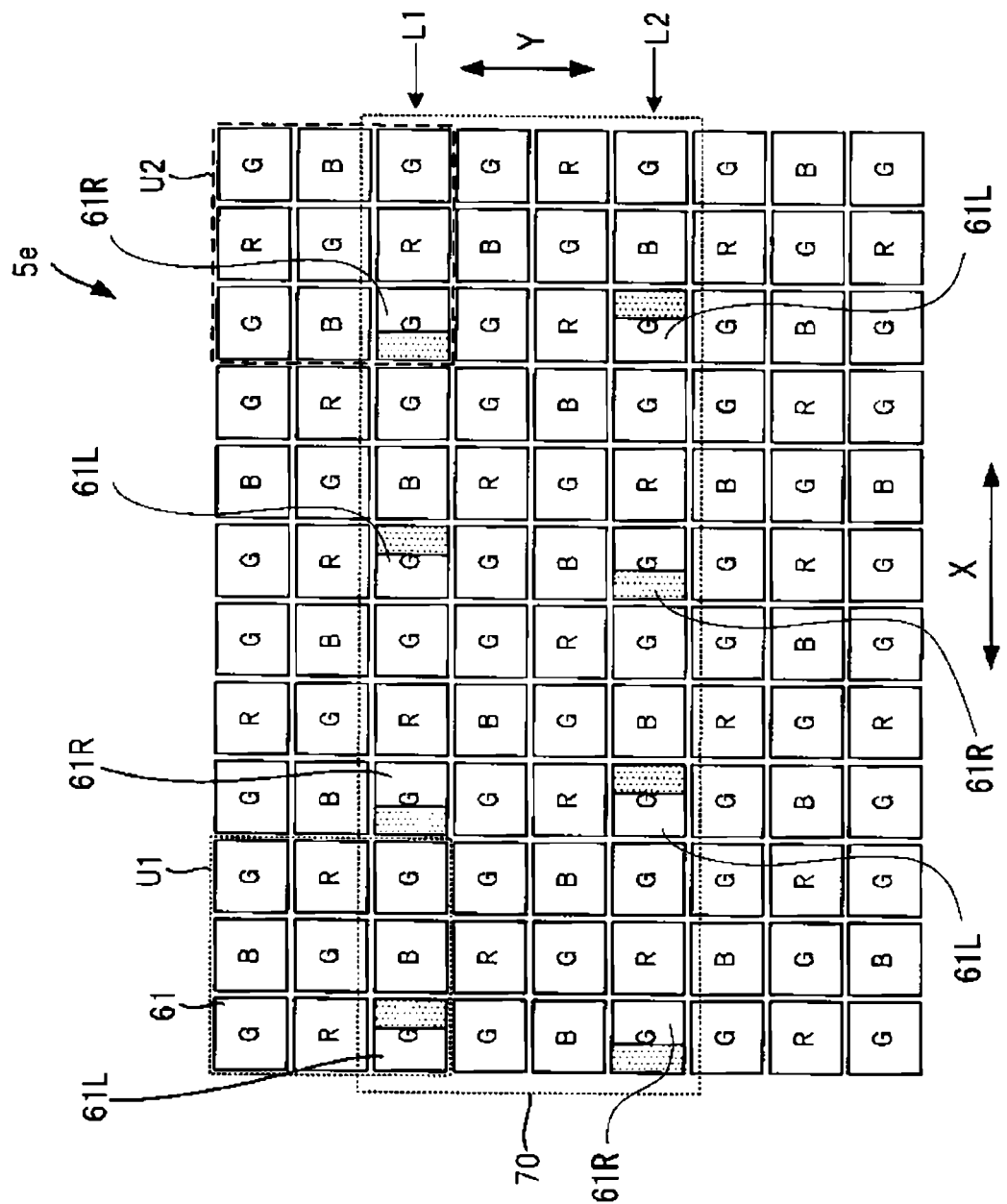
FIG. 13 is a plan pictorial view of a solid-state image-capture element 5e that is a modified embodiment of the solid-state image-capture element 5 mounted to the digital camera shown in FIG. 1.

FIG. 13 is a plan pictorial view of a solid-state image-capture element 5e that is a modified embodiment of the solid-state image-capture element 5 mounted to the digital camera shown in FIG. 1. In the solid-state image-capture element 5e, the arrangement of the color filters mounted on the respective pixels of the solid-state image-capture element 5b shown in FIG. 10 is changed. The color filters mounted in the solid-state image-capture element 5e are arranged so that a ratio of the number of R filters, the number of B filters and the number of G filters is 1:1:2.5.

The color filters mounted in the solid-state image-capture element 5e are arranged so that a filter arrangement in a unit U1 shown in FIG. 13 and a filter arrangement in a unit U2, in which positions of an R filter and a B filter of the filter arrangement in the unit U1 are changed each other, are arranged in a checker board shape.

In other words, the unit U1 and the unit U2 are alternately arranged in the horizontal and vertical directions.

In the unit U1, the G filters that are brightness filters are arranged at four corners and a center. Also, in the unit U1, the R filters are arranged at both sides of the central G filter in the row direction X and the B filters are arranged at both sides of the central G filter in the column direction Y.

The unit U2 is configured so that the positions of the R and B filters in the unit U1 are changed each other.

Also, the units U1, U2 are alternately arranged in the horizontal and vertical directions, so that the G filters at the four corners of the units U1, U2 include the square arrangement of the G filters of 2×2 pixels.

The color filter arrangement of the solid-state image-capture element 5e is configured so that a basic arrangement pattern, which is a filter arrangement of 6 lines×6 columns formed by alternately arranging the two units U1 and the two units U2 in the horizontal and vertical directions, is repeated.

In the color filter arrangement configured as described above, the first filters (G filters) corresponding to the first color (G), which most contributes to the acquisition of the brightness signal, are arranged in the respective lines of the horizontal, vertical and oblique directions of the color filter arrangement. Also, a ratio of the number of pixels of the first color corresponding to the first filter becomes larger than ratios of the number of pixels of the second colors (B, R) corresponding to the second filters (B filter, R filter) of the second colors (B, R) except for the first color. By this arrangement, it is possible to improve reproduction precision of simultaneous processing in a high frequency region and to suppress the aliasing.

Also, since the one or more second filters (B filter, R filter) corresponding to the second colors (B, R) are arranged in the respective lines of the horizontal and vertical directions of the color filter arrangement in the basic arrangement pattern, it is possible to suppress occurrence of color moiré (false color), thereby realizing the high resolution.

Also, the color filter arrangement is configured so that the predetermined basic arrangement pattern is repeated in the horizontal and vertical directions. Thus, when performing the simultaneous (interpolation) processing at a rear stage, it is possible to perform the processing in accordance with the repeating pattern and to simplify the processing of the rear stage, compared to the conventional random arrangement.

In the solid-state image-capture element 5e having the color filters mounted thereto, parts of the G filter-mounted pixels are the phase difference detection pixels 61L, 61R.

In the example of FIG. 13, the phase difference detection pixel 61L and the phase difference detection pixel 61R are alternately arranged at an equal interval on the line L1 in a phase difference detection area 70 and the phase difference detection pixel 61R and the phase difference detection pixel 61L are alternately arranged at an equal interval on the line L2 in the phase difference detection area 70.

On the line L1 and the line L2, positions at which the phase difference detection pixels are arranged are matched in the row direction X. Each phase difference detection pixel 61L on the line L1 and each phase difference detection pixel 61R on the line L2 located next to the line L1 in the column direction Y configure a first pair. Also, each phase difference detection pixel 61R on the line L1 and each phase difference detection pixel 61L on the line L2 located next to the line L1 in the column direction Y configure a second pair.

The solid-state image-capture element 5e may have a plurality of the phase difference detection areas 70.

In this way, the solid-state image-capture element 5e having the configuration shown in FIG. 13 also can obtain the same effect as the solid-state image-capture element 5b shown in FIG. 10. Also in the solid-state image-capture element 5e, the configuration can be applied in which the phase difference detection pixels are reversely arranged in the adjacent phase difference detection area, as shown in FIG. 11.

Figure 14:
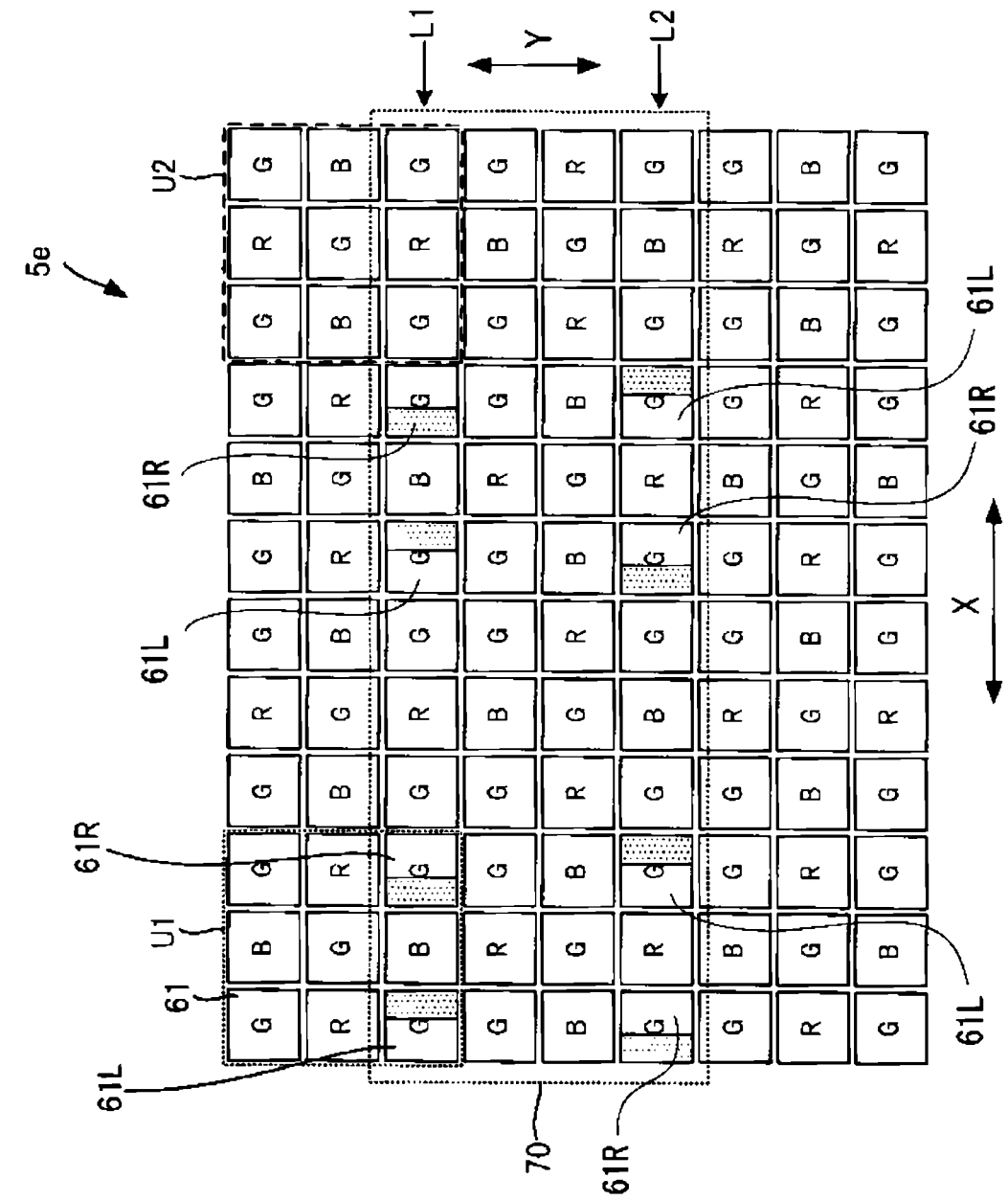
FIG. 14 is a plan pictorial view of a solid-state image-capture element 5f that is a modified embodiment of the solid-state image-capture element 5e shown in FIG. 13.
Figure 15:
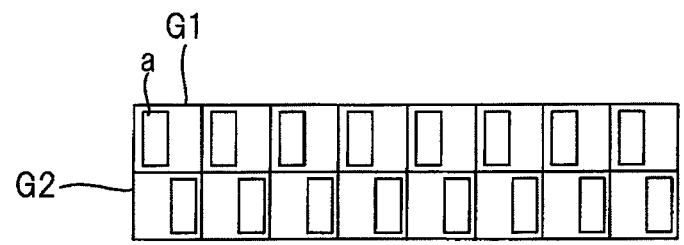
FIG. 15 shows a configuration of a phase difference detection sensor of the related art.

FIG. 14 is a plan pictorial view of a solid-state image-capture element 5f that is a modified embodiment of the solid-state image-capture element 5e shown in FIG. 13. In FIG. 13, the solid-state image-capture element 5f has the same configuration as the solid-state image-capture element 5e, except that each phase difference detection pixel 61R on the line L1 and each phase difference detection pixel 61L on the line L2 are moved leftwards by one pixel.

Even with the configuration, it is possible to obtain the same effect as the solid-state image-capture element 5b shown in FIG. 10. However, in the configuration of FIG. 14, if the processing shown in FIG. 6 is performed, the signal arrangement interval in the signal group for which the correlation calculation is performed is not equal and the precision is lowered. Therefore, the processing shown in FIG. 6 is not preferably performed.

In the above illustrative embodiments, the color filters are mounted to the solid-state image-capture element. However, a solid-state image-capture element for monochrome image-capture to which a color filter is not mounted is also possible. Also, in the above descriptions, the G filter-mounted pixel is used as the phase difference detection pixel. However, the R filter-mounted pixel or the B filter-mounted pixel may be used as the phase difference detection pixel.

Also, in the above descriptions, the solid-state image-capture element is used for image-capture and for phase difference detection. However, a solid-state image-capture element only for phase difference detection for which an image-capture pixel is not provided is also possible.

In this specification, the line consisting of only the image-capture pixels may be arranged between the lines including the phase difference detection pixels. However, when mentioning the positional relation between the lines of the phase difference detection pixels, the line consisting of only the image-capture pixels is excluded. For example, in FIG. 10, the line of the phase difference detection pixels, which is located next to the line L1 in the column direction Y, is the line L1. Also, when mentioning the positional relation with which the first pair and the second pair are arranged, the image-capture pixel may be included therebetween.

As described above, the specification discloses the following configurations.

A disclosed solid-state image-capture element includes a pair of a first phase difference detection pixel, which receives one of a pair of light beams passing through iris regions of different positions of an imaging optical system, and a second phase difference detection pixel, which receives the other of the pair of light beams, wherein the first phase difference detection pixel and the second phase difference detection pixel configuring the pair are arranged in a direction intersecting with a phase difference detection direction, wherein the pair includes at least one or a plurality of a first pair and a second pair, respectively, in which a positional relation of the first phase difference detection pixel and the second phase difference detection pixel is reverse to each other, and wherein the first pair and the second pair are arranged in the phase difference detection direction or in a direction orthogonal to the phase difference detection direction.

The disclosed solid-state image-capture element further includes at least one first phase difference detection area in which a first line on which the first phase difference detection pixel and the second phase difference detection pixel are alternately arranged in the phase difference detection direction and a second line on which the first phase difference detection pixel and the second phase difference detection pixel are alternately arranged in the phase difference detection direction are arranged in the direction orthogonal to the phase difference detection direction, wherein in the first phase difference detection area, the second phase difference detection pixel included on the second line is located in the direction intersecting with the phase difference detection direction as regards the first phase difference detection pixel included on the first line and the first phase difference detection pixel included on the second line is located in the intersecting direction as regards the second phase difference detection pixel included on the first line, wherein the first pair is configured by the first phase difference detection pixel on the first line in the first phase difference detection area and the second phase difference detection pixel on the second line located in the intersecting direction as regards the first phase difference detection pixel, and wherein the second pair is configured by the second phase difference detection pixel on the first line in the first phase difference detection area and the first phase difference detection pixel on the second line located in the intersecting direction as regards the second phase difference detection pixel.

The solid-state image-capture element is a MOS-type capable of reading out a signal by a rolling shutter method.

A disclosed imaging device includes the solid-state image-capture element; an imaging optical system that is arranged at a front stage of the solid-state image-capture element; an image-capture element driving unit that reads out a signal from the solid-state image-capture element by a rolling shutter method; a phase difference information calculation unit that calculates phase difference information corresponding to the phase difference detection area by a calculation using a first calculation result, which is obtained by performing a correlation calculation between a signal read from the first phase difference detection pixel on the first line in the first phase difference detection area and a signal read out from the second phase difference detection pixel configuring a pair together with the first phase difference detection pixel, and a second calculation result, which is obtained by performing a correlation calculation between a signal read from the second phase difference detection pixel on the first line in the first phase difference detection area and a signal read out from the first phase difference detection pixel configuring a pair together with the second phase difference detection pixel, and a focus control unit that controls a focus of the imaging optical system, based on the phase difference information calculated by the phase difference information calculation unit.

In the disclosed imaging device, the phase difference information calculation unit can execute first processing and second processing, as processing for calculating the phase difference information, the first processing is processing of calculating the phase difference information by using both the first calculation result and the second calculation result, the second processing is processing of calculating, as the phase difference information, a calculation result that is obtained by performing a correlation calculation between signals read out from the first phase difference detection pixels on the first line and second line in the first phase difference detection area and signals read out from the second phase difference detection pixels on the first line and second line in the first phase difference detection area, and the focus control unit selects any one of the phase difference information, which is calculated by the first processing, and the phase difference information, which is calculated by the second processing, based on at least one of an imaging condition and a subject condition, and controls the focus on the basis of the selected phase difference information.

In the disclosed imaging device, the solid-state image-capture element includes a pixel group consisting of a plurality of pixels arranged in a two-dimensional shape, the pixel group includes the first phase difference detection pixel, the second phase difference detection pixel and an image-capture element that receives both the pair of light beams, each of the first line and the second line includes the first phase difference detection pixel, the second phase difference detection pixel and the image-capture element, and the first phase difference detection pixel and the second phase difference detection pixel are alternately arranged in the phase difference detection direction with at least one image-capture element being interposed therebetween, and an interval of the first phase difference detection pixel and the second phase difference detection pixel on each of the first line and the second line is non-uniform.

In the disclosed imaging device, the solid-state image-capture element includes at least one second phase difference detection area in which positions of the first phase difference detection pixel and the second phase difference detection pixel of the first phase difference detection area are reverse to each other, and the first phase difference detection area and the second phase difference detection area are alternately arranged in a direction orthogonal to the phase difference detection direction.

The disclosed imaging device further includes at least one phase difference detection area including two first lines on which the first phase difference detection pixels are arranged in the phase difference detection direction and two second lines on which the second phase difference detection pixels are arranged in the phase difference detection direction, the phase difference detection area is configured so that the two second lines are arranged between the two first lines, the first pair is configured by each first phase difference detection pixel on the first line of a first row in the phase difference detection area and each second phase difference detection pixel on the second line of a second row located in a direction intersecting with the phase difference detection direction as regards each first phase difference detection pixel, and the second pair is configured by each second phase difference detection pixel on the second line of a third row in the phase difference detection area and each first phase difference detection pixel on the first line of a fourth row located in the direction intersecting with the phase difference detection direction as regards each second phase difference detection pixel.

The disclosed solid-state image-capture element is a MOS-type capable of reading out a signal by a rolling shutter method.

A disclosed imaging device includes the solid-state image-capture element; an imaging optical system that is arranged at a front stage of the solid-state image-capture element; an image-capture element driving unit that reads out a signal from the solid-state image-capture element a the rolling shutter method; a phase difference information calculation unit that calculates phase difference information corresponding to the phase difference detection area by a calculation using a first calculation result, which is obtained by performing a correlation calculation between a signal read from each first phase difference detection pixel on a first row in the phase difference detection area and a signal read out from each second phase difference detection pixel of a third row in the phase difference detection area, and a second calculation result, which is obtained by performing a correlation calculation between a signal read from each second phase difference detection pixel on a second row in the phase difference detection area and a signal read out from each first phase difference detection pixel of a fourth row in the phase difference detection area, and a focus control unit that controls a focus of the imaging optical system, based on the phase difference information calculated by the phase difference information calculation unit.

In the disclosed imaging device, the phase difference information calculation unit can execute first processing and second processing, as processing for calculating the phase difference information, the first processing is processing of calculating the phase difference information by using both the first calculation result and the second calculation result, the second processing is processing of calculating, as the phase difference information, a calculation result that is obtained by performing a correlation calculation between signals read out from the first phase difference detection pixels on the two first lines in the phase difference detection area and signals read out from the second phase difference detection pixels on the two second lines in the phase difference detection area, and the focus control unit selects any one of the phase difference information, which is calculated by the first processing, and the phase difference information, which is calculated by the second processing, based on at least one of an imaging condition and a subject condition, and controls the focus on the basis of the selected phase difference information.

A disclosed focus control method is a focus control method in an imaging device including the solid-state image-capture element and an imaging optical system that is arranged at a front stage of the solid-state image-capture element. The method includes steps of reading out a signal from the solid-state image-capture element by a rolling shutter method; calculating phase difference information corresponding to the phase difference detection area by a calculation using a first calculation result, which is obtained by performing a correlation calculation between a signal read from the first phase difference detection pixel on the first line in the phase difference detection area and a signal read out from the second phase difference detection pixel configuring a pair together with the first phase difference detection pixel, and a second calculation result, which is obtained by performing a correlation calculation between a signal read from the second phase difference detection pixel on the first line in the phase difference detection area and a signal read out from the first phase difference detection pixel configuring a pair together with the second phase difference detection pixel, and controlling a focus of the imaging optical system, based on the calculated phase difference information.

A disclosed focus control method is a focus control method in an imaging device including the solid-state image-capture element and an imaging optical system that is arranged at a front stage of the solid-state image-capture element. The method includes steps of reading out a signal from the solid-state image-capture element by a rolling shutter method; calculating phase difference information corresponding to the phase difference detection area by a calculation using a first calculation result, which is obtained by performing a correlation calculation between a signal read from each first phase difference detection pixel on a first row in the phase difference detection area and a signal read out from each second phase difference detection pixel of a third row in the phase difference detection area, and a second calculation result, which is obtained by performing a correlation calculation between a signal read from each second phase difference detection pixel on a second row in the phase difference detection area and a signal read out from each first phase difference detection pixel of a fourth row in the phase difference detection area, and controlling a focus of the imaging optical system, based on the phase difference information calculated by the phase difference information calculation unit.

According to the solid-state image-capture element, the imaging device and the focus control method of the invention, it is possible to maintain the phase difference detection precision, irrespective of the direction along which the edge of the subject extends.

Although the invention has been specifically with reference to the specific illustrative embodiments, it is apparent to one skilled in the art that a variety of changes and modifications can be made without departing from the spirit and scope of the invention.

What is claimed is:

1. A solid-state image-capture element comprising:
a pair of a first phase difference detection pixel, which receives one of a pair of light beams passing through iris regions of different positions of an imaging optical system,
a second phase difference detection pixel, which receives the other of the pair of light beams;
at least one first phase difference detection area in which a first line and a second line are arranged in the direction orthogonal to the phase difference detection direction;
wherein the first phase difference detection pixel and the second phase difference detection pixel are alternately arranged in the phase difference detection direction on the first line; and
wherein the first phase difference detection pixel and the second phase difference detection pixel are alternately arranged in the phase difference detection direction on the second line,
wherein the first phase difference detection pixel and the second phase difference detection pixel configuring the pair are arranged in a direction intersecting with a phase difference detection direction,
wherein the pair comprises a plurality of first pairs and a plurality of second pairs in which a positional relation of the first phase difference detection pixel and the second phase difference detection pixel in each of the first pairs is reverse to each of the second pairs,
wherein the first pairs and the second pairs are alternately arranged in the phase difference detection direction,
wherein in the first phase difference detection area, the second phase difference detection pixel included on the second line is located in the direction intersecting with the phase difference detection direction as regards the first phase difference detection pixel included on the first line and the first phase difference detection pixel included on the second line is located in the intersecting direction as regards the second phase difference detection pixel included on the first line,
wherein the first pair is configured by the first phase difference detection pixel on the first line in the first phase difference detection area and the second phase difference detection pixel on the second line located in the intersecting direction as regards the first phase difference detection pixel, and
wherein the second pair is configured by the second phase difference detection pixel on the first line in the first phase difference detection area and the first phase difference detection pixel on the second line located in the intersecting direction as regards the second phase difference detection pixel.

2. The solid-state image-capture element according to claim 1, wherein the solid-state image-capture element is a MOS-type capable of reading out a signal by a rolling shutter method.

3. A focus control method in an imaging device comprising the solid-state image-capture element according to claim 2 and an imaging optical system that is arranged at a front stage of the solid-state image-capture element, the method comprising steps of:
reading out a signal from the solid-state image-capture element by a rolling shutter method;
calculating phase difference information corresponding to the phase difference detection area by a calculation using a first calculation result, which is obtained by performing a correlation calculation between a signal read from the first phase difference detection pixel on the first line in the phase difference detection area and a signal read out from the second phase difference detection pixel configuring a pair together with the first phase difference detection pixel, and a second calculation result, which is obtained by performing a correlation calculation between a signal read from the second phase difference detection pixel on the first line in the phase difference detection area and a signal read out from the first phase difference detection pixel configuring a pair together with the second phase difference detection pixel, and
controlling a focus of the imaging optical system, based on the calculated phase difference information.

4. An imaging device comprising:
the solid-state image-capture element according to claim 2;
an imaging optical system that is arranged at a front stage of the solid-state image-capture element;
an image-capture element driving unit that reads out a signal from the solid-state image-capture element by a rolling shutter method;
a phase difference information calculation unit that calculates phase difference information corresponding to the phase difference detection area by a calculation using a first calculation result, which is obtained by performing a correlation calculation between a signal read from the first phase difference detection pixel on the first line in the first phase difference detection area and a signal read out from the second phase difference detection pixel configuring a pair together with the first phase difference detection pixel, and a second calculation result, which is obtained by performing a correlation calculation between a signal read from the second phase difference detection pixel on the first line in the first phase difference detection area and a signal read out from the first phase difference detection pixel configuring a pair together with the second phase difference detection pixel, and
a focus control unit that controls a focus of the imaging optical system, based on the phase difference information calculated by the phase difference information calculation unit.

5. The imaging device according to claim 4, wherein the phase difference information calculation unit can execute first processing and second processing, as processing for calculating the phase difference information,
wherein the first processing is processing of calculating the phase difference information by using both the first calculation result and the second calculation result,
wherein the second processing is processing of calculating, as the phase difference information, a calculation result that is obtained by performing a correlation calculation between signals read out from the first phase difference detection pixels on the first line and second line in the first phase difference detection area and signals read out from the second phase difference detection pixels on the first line and second line in the first phase difference detection area, and
wherein the focus control unit selects any one of the phase difference information, which is calculated by the first processing, and the phase difference information, which is calculated by the second processing, based on at least one of an imaging condition and a subject condition, and controls the focus on the basis of the selected phase difference information.

6. The imaging device according to claim 4, wherein the solid-state image-capture element comprises a pixel group consisting of a plurality of pixels arranged in a two-dimensional shape,
  wherein the pixel group comprises the first phase difference detection pixel, the second phase difference detection pixel and an image-capture element that receives both the pair of light beams,
  wherein each of the first line and the second line comprises the first phase difference detection pixel, the second phase difference detection pixel and the image-capture element, and the first phase difference detection pixel and the second phase difference detection pixel are alternately arranged in the phase difference detection direction with at least one image-capture element being interposed therebetween, and
  wherein an interval of the first phase difference detection pixel and the second phase difference detection pixel on each of the first line and the second line is non-uniform.

7. The imaging device according to claim 4, wherein the solid-state image-capture element comprises at least one second phase difference detection area in which positions of the first phase difference detection pixel and the second phase difference detection pixel of the first phase difference detection area are reverse to each other, and the first phase difference detection area and the second phase difference detection area are alternately arranged in a direction orthogonal to the phase difference detection direction.

8. An imaging device comprising:
  a pair of a first phase difference detection pixel, which receives one of a pair of light beams passing through iris regions of different positions of an imaging optical system, and a second phase difference detection pixel, which receives the other of the pair of light beams,
  wherein the first phase difference detection pixel and the second phase difference detection pixel configuring the pair are arranged in a direction intersecting with a phase difference detection direction,
  wherein the pair comprises at least one or a plurality of a first pair and a second pair, respectively, in which a positional relation of the first phase difference detection pixel and the second phase difference detection pixel is reverse to each other,
  wherein the solid-state image-capture element further comprises at least one phase difference detection area comprising two first lines on which the first phase difference detection pixels are arranged in the phase difference detection direction and two second lines on which the second phase difference detection pixels are arranged in the phase difference detection direction,
  wherein the phase difference detection area is configured so that the two second lines are arranged between the two first lines,
  wherein the first pair is configured by each first phase difference detection pixel on the first line of a first row in the phase difference detection area and each second phase difference detection pixel on the second line of a second row located in a direction intersecting with the phase difference detection direction as regards each first phase difference detection pixel,
  wherein the second pair is configured by each second phase difference detection pixel on the second line of a third row in the phase difference detection area and each first phase difference detection pixel on the first line of a fourth row located in the direction intersecting with the phase difference detection direction as regards each second phase difference detection pixel, and
  wherein the solid-state image-capture element is a MOS-type capable of reading out a signal by a rolling shutter method;
  an imaging optical system that is arranged at a front stage of the solid-state image-capture element;
  an image-capture element driving unit that reads out a signal from the solid-state image-capture element a the rolling shutter method;
  a phase difference information calculation unit that calculates phase difference information corresponding to the phase difference detection area by a calculation using a first calculation result, which is obtained by performing a correlation calculation between a signal read from each first phase difference detection pixel on a first row in the phase difference detection area and a signal read out from each second phase difference detection pixel of a third row in the phase difference detection area, and a second calculation result, which is obtained by performing a correlation calculation between a signal read from each second phase difference detection pixel on a second row in the phase difference detection area and a signal read out from each first phase difference detection pixel of a fourth row in the phase difference detection area, and
  a focus control unit that controls a focus of the imaging optical system, based on the phase difference information calculated by the phase difference information calculation unit.

9. The imaging device according to claim 8,
  wherein the phase difference information calculation unit can execute first processing and second processing, as processing for calculating the phase difference information,
  wherein the first processing is processing of calculating the phase difference information by using both the first calculation result and the second calculation result,
  wherein the second processing is processing of calculating, as the phase difference information, a calculation result that is obtained by performing a correlation calculation between signals read out from the first phase difference detection pixels on the two first lines in the phase difference detection area and signals read out from the second phase difference detection pixels on the two second lines in the phase difference detection area, and
  wherein the focus control unit selects any one of the phase difference information, which is calculated by the first processing, and the phase difference information, which is calculated by the second processing, based on at least one of an imaging condition and a subject condition, and controls the focus on the basis of the selected phase difference information.

10. A focus control method in an imaging device comprising:
  a pair of a first phase difference detection pixel, which receives one of a pair of light beams passing through iris regions of different positions of an imaging optical system, and a second phase difference detection pixel, which receives the other of the pair of light beams,
  wherein the first phase difference detection pixel and the second phase difference detection pixel configuring the pair are arranged in a direction intersecting with a phase difference detection direction,
  wherein the pair comprises at least one or a plurality of a first pair and a second pair, respectively, in which a positional relation of the first phase difference detection pixel and the second phase difference detection pixel is reverse to each other, wherein the solid-state image-capture element further comprises at least one phase difference detection area comprising two first lines on which the first phase difference detection pixels are arranged in the phase difference detection direction and two second lines on which the second phase difference detection pixels are arranged in the phase difference detection direction, wherein the phase difference detection area is configured so that the two second lines are arranged between the two first lines, wherein the first pair is configured by each first phase difference detection pixel on the first line of a first row in the phase difference detection area and each second phase difference detection pixel on the second line of a second row located in a direction intersecting with the phase difference detection direction as regards each first phase difference detection pixel, wherein the second pair is configured by each second phase difference detection pixel on the second line of a third row in the phase difference detection area and each first phase difference detection pixel on the first line of a fourth row located in the direction intersecting with the phase difference detection direction as regards each second phase difference detection pixel, and wherein the solid-state image-capture element is a MOS-type capable of reading out a signal by a rolling shutter method;

an imaging optical system that is arranged at a front stage of the solid-state image-capture element, the method comprising steps of:

reading out a signal from the solid-state image-capture element by a rolling shutter method;

calculating phase difference information corresponding to the phase difference detection area by a calculation using a first calculation result, which is obtained by performing a correlation calculation between a signal read from each first phase difference detection pixel on a first row in the phase difference detection area and a signal read out from each second phase difference detection pixel of a third row in the phase difference detection area, and a second calculation result, which is obtained by performing a correlation calculation between a signal read from each second phase difference detection pixel on a second row in the phase difference detection area and a signal read out from each first phase difference detection pixel of a fourth row in the phase difference detection area, and controlling a focus of the imaging optical system, based on the phase difference information calculated by the phase difference information calculation unit.

\* \* \* \* \*